(12) United States Patent
Ingale et al.

(10) Patent No.: US 11,395,365 B2
(45) Date of Patent: Jul. 19, 2022

(54) METHOD AND SYSTEM FOR HANDLING PDCP OPERATION IN WIRELESS COMMUNICATION SYSTEM

(71) Applicant: Samsung Electronics Co., Ltd., Suwon-si (KR)

(72) Inventors: Mangesh Abhimanyu Ingale, Bangalore (IN); Neha Sharma, Bangalore (IN); Soeng-hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/651,213

(22) PCT Filed: Sep. 28, 2018

(86) PCT No.: PCT/KR2018/011589
§ 371 (c)(1),
(2) Date: Mar. 26, 2020

(87) PCT Pub. No.: WO2019/066588
PCT Pub. Date: Apr. 4, 2019

(65) Prior Publication Data
US 2020/0245401 A1 Jul. 30, 2020

(30) Foreign Application Priority Data

Sep. 28, 2017 (IN) .............................. 201741034571
Sep. 27, 2018 (IN) .............................. 201741034571

(51) Int. Cl.
*H04W 80/02* (2009.01)
*H04W 76/15* (2018.01)
(Continued)

(52) U.S. Cl.
CPC ........... *H04W 80/02* (2013.01); *H04L 69/322* (2013.01); *H04W 28/06* (2013.01);
(Continued)

(58) Field of Classification Search
CPC ..... H04W 76/16; H04W 76/27; H04W 76/15; H04W 8/24; H04W 80/08; H04W 24/10;
(Continued)

(56) References Cited

U.S. PATENT DOCUMENTS 8,743,831 B2 6/2014 Wang et al.
10,432,291 B2 * 10/2019 Agiwal ............... H04W 12/033
(Continued)

FOREIGN PATENT DOCUMENTS

CN 101933280 A 12/2010
CN 102056226 A 5/2011
(Continued)

OTHER PUBLICATIONS

The LTE link-layer design by Anna Larmo; Magnus Lindström; Michael Meyer; Ghyslain Pelletier; Johan Torsner; Henning Wiemann Published in: IEEE Communications Magazine (vol. 47, Issue: 4, Apr. 2009) (Year: 2009).*
(Continued)

*Primary Examiner* — William D Cumming

(57) ABSTRACT

Embodiments herein disclose a method for handling PDCP operation by an EN-DC capable UE in a wireless communication system. The method includes receiving, by an EN-DC capable UE, LTE PDCP PDUs from the LTE RLC entity by a receiver LTE PDCP entity upon re-establishing LTE RLC entity based on the indication that indicates a PDCP version change from a LTE PDCP to a NR PDCP. Further, the method includes processing the LTE PDCP PDUs at the receiver LTE PDCP entity using a LTE format.
(Continued)

Further, the method includes reestablishing the receiver LTE PDCP entity and a transmitter LTE PDCP entity of the UE.

10 Claims, 14 Drawing Sheets

(51) Int. Cl.
| | | |
|---|---|---|
| *H04L 69/322* | (2022.01) | |
| *H04W 28/06* | (2009.01) | |
| *H04W 36/00* | (2009.01) | |
| *H04W 36/14* | (2009.01) | |
| *H04W 88/06* | (2009.01) | |

(52) U.S. Cl.
CPC ... *H04W 36/0022* (2013.01); *H04W 36/0066* (2013.01); *H04W 36/14* (2013.01); *H04W 76/15* (2018.02); *H04W 88/06* (2013.01)

(58) Field of Classification Search
CPC ............ H04W 5/0048; H04W 72/042; H04W 12/108; H04W 12/35; H04W 12/04; H04W 36/02; H04W 76/18; H04W 80/24; H04W 12/106; H04L 69/04
USPC .................. 370/331, 241, 394; 455/410, 436
See application file for complete search history.

(56) References Cited

U.S. PATENT DOCUMENTS

| | | | |
|---|---|---|---|
| 10,485,042 B2 | 11/2019 | Hong et al. | |
| 10,784,949 B2* | 9/2020 | Agiwal | H04W 76/19 |
| 10,785,705 B1* | 9/2020 | Rofougaran | H04W 48/08 |
| 10,834,724 B1* | 11/2020 | Rofougaran | H04B 7/088 |
| 10,932,316 B2* | 2/2021 | Lei | H04W 76/30 |
| 10,972,947 B2* | 4/2021 | Balasubramanian ... | H04W 8/08 |
| 10,979,949 B2* | 4/2021 | Tsuboi | H04L 5/0091 |
| 11,026,291 B2* | 6/2021 | Sharma | H04W 80/02 |
| 11,115,105 B2* | 9/2021 | Agiwal | H04W 12/04 |
| 11,272,449 B2 | 3/2022 | Yi et al. | |
| 2008/0123655 A1* | 5/2008 | Kim | H04L 1/1867 370/394 |
| 2009/0016301 A1* | 1/2009 | Sammour | H04L 69/04 370/331 |
| 2009/0104890 A1* | 4/2009 | Wang | H04W 12/106 455/410 |
| 2009/0207739 A1* | 8/2009 | Chun | H04L 1/1829 370/241 |
| 2010/0029280 A1* | 2/2010 | Tenny | H04W 36/02 455/436 |
| 2014/0215225 A1 | 7/2014 | Koliesnik | |
| 2015/0215965 A1 | 7/2015 | Yamada | |
| 2017/0171905 A1 | 6/2017 | Uchino et al. | |
| 2017/0215225 A1 | 7/2017 | Yi et al. | |
| 2018/0083688 A1* | 3/2018 | Agiwal | H04M 3/537 |
| 2019/0191345 A1 | 6/2019 | Yamada | |
| 2019/0313294 A1* | 10/2019 | Balasubramanian | H04W 36/0038 |
| 2020/0028564 A1* | 1/2020 | Agiwal | H04B 7/0697 |
| 2020/0077288 A1* | 3/2020 | Tsuboi | H04W 24/10 |
| 2020/0169906 A1* | 5/2020 | Tsuboi | H04W 76/27 |
| 2020/0178128 A1* | 6/2020 | Ingale | H04W 36/0022 |
| 2020/0178332 A1* | 6/2020 | Sharma | H04W 80/08 |
| 2020/0245401 A1* | 7/2020 | Ingale | H04W 80/02 |
| 2020/0260515 A1* | 8/2020 | Hashmi | H04W 28/0815 |
| 2020/0275519 A1* | 8/2020 | Sharma | H04W 12/04 |
| 2020/0288528 A1* | 9/2020 | Lei | H04W 76/30 |
| 2020/0314717 A1* | 10/2020 | Kim | H04W 74/0833 |
| 2020/0344739 A1* | 10/2020 | Rofougaran | H04W 56/0015 |
| 2020/0367117 A1 | 11/2020 | Yi et al. | |
| 2020/0367144 A1* | 11/2020 | Rofougaran | H04W 56/001 |
| 2020/0374961 A1* | 11/2020 | Ingale | H04W 12/0433 |
| 2021/0006322 A1* | 1/2021 | Agiwal | H04W 12/033 |
| 2021/0014850 A1* | 1/2021 | Rofougaran | H04W 56/0015 |
| 2021/0022146 A1* | 1/2021 | Hong | H04W 24/10 |
| 2021/0051767 A1* | 2/2021 | Zhang | H04W 76/34 |
| 2021/0076438 A1* | 3/2021 | Lee | H04W 76/15 |
| 2021/0099935 A1 | 4/2021 | Ozturk et al. | |
| 2021/0399786 A1* | 12/2021 | Agiwal | H04W 76/19 |
| 2022/0078771 A1 | 3/2022 | Jang et al. | |

FOREIGN PATENT DOCUMENTS

| | | | | |
|---|---|---|---|---|
| CN | 104488308 A | 4/2015 | | |
| CN | 105103610 A | 11/2015 | | |
| CN | 105917727 A | 8/2016 | | |
| CN | 106537882 A | 3/2017 | | |
| CN | 107211475 A | 9/2017 | | |
| CN | 107409336 A | 11/2017 | | |
| EP | 3494756 A1 | 6/2019 | | |
| WO | 2016021820 A1 | 2/2016 | | |
| WO | 2018030798 A1 | 2/2018 | | |
| WO | 2018203702 A1 | 11/2018 | | |
| WO | 2019066588 A1 | 4/2019 | | |
| WO | WO-2020032455 A1 * | 2/2020 | ........... | H04L 1/1671 |
| WO | WO-2020166948 A1 * | 8/2020 | ........ | H04W 52/0274 |
| WO | WO-2020204452 A1 * | 10/2020 | ............. | H04L 29/08 |

OTHER PUBLICATIONS

Research and realization of RLC layer unacknowledged mode in LTE system by Wang Huahua • Zhao Zhongxuan Published in: 2013 2nd International Symposium on Instrumentation and Measurement, Sensor Network and Automation (IMSNA) (pp. 962-964) Dec. 2013 (Year: 2013).*
B. Cui, S. Feng, Q. Xiao and M. Li, "Detection of LTE Protocol Based on Format Fuzz," 2015 10th International Conference on Broadband and Wireless Computing, Communication and Applications (BWCCA), Nov. 2015, pp. 187-192, doi: 10.1109/BWCCA.2015.42. (Year: 2015).*
ISA/KR, International Search Report and Written Opinion of the International Searching Authority, International Application No. PCT/KR2018/011589, dated Jan. 18, 2019, 10 pages.
Huawei, et al, "Discussion on bearer type change and L2 handling at mobility," R2-1708954, 3GPP TSG-RAN WG2 Meeting #99, Berlin, Germany, Aug. 21-25, 2017, 8 pages.
Huawei, et al, "Summary of RAN2#99 offline discussion #22," R2-1709881, 3GPP TSG-RAN WG2 Meeting #99, Berlin, Germany, Aug. 21-25, 2017, 13 pages.
Samsung, "Lossless PDCP version change between LTE and NR," R2-1709028, 3GPP TSG-RAN WG2 Meeting #99, Berlin, Germany, Aug. 21-25, 2017, 3 pages.
Samsung, "PDCP for MCG DRB and SRB," R2-1709165, 3GPP TSG-RAN WG2 Meeting #99, Berlin, Germany, Aug. 21-25, 2017, 5 pages.
Supplementary European Search Report in connection with European Application No. 18863598.1 dated Jun. 4, 2020, 9 pages.
China National Intellectual Property Administration , "The First Office Action" dated Jan. 6, 2022, in connection with Chinese Patent Application No. 201880076613.X, 17 pages.
European Patent Office, "Communication under Rule 71(3) EPC; Intention to grant" dated Feb. 24, 2022, in connection with European Patent Application No. 18863598.1, 80 pages.
Wang, "The Intra-E-UTRAN Handover in ECM-Connected State" School of Communication and Information Technology, Xi'an University of Posts & Telecommunications, Xi'an, 710061, China, Dec. 2014, 5 pages.
Oppo, "PDCP version reconfiguration" 3GPP TSG-RAN2 Meeting #99, R2-1707709, Berlin, Germany, Aug. 21-25, 2017, 3 pages.
Liu et al., "Research and design of PDCP layer in LTE protocol stack" Journal of Chongqing University of Posts and Telecommunications (Natural Science Edition), vol. 23, No. 1, Feb. 2011, 2 pages.

* cited by examiner

METHOD AND SYSTEM FOR HANDLING PDCP OPERATION IN WIRELESS COMMUNICATION SYSTEM

CROSS-REFERENCE TO RELATED APPLICATIONS

This application is a 371 National Stage of International Application No. PCT/KR2018/011589, filed Sep. 28, 2018, which claims priority to Indian Patent Application No. 201741034571, filed Sep. 28, 2017, and Indian Patent Application No. 201741034571, filed Sep. 27, 2018, the disclosures of which are herein incorporated by reference in their entirety.

BACKGROUND

1. Field

The present disclosure relates to a wireless communication system, and more specially related to a method and system for handling PDCP operation in a wireless communication system.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

The principal object of the embodiments herein is to provide a method and system for handling PDCP operation in a wireless communication system.

DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1A:
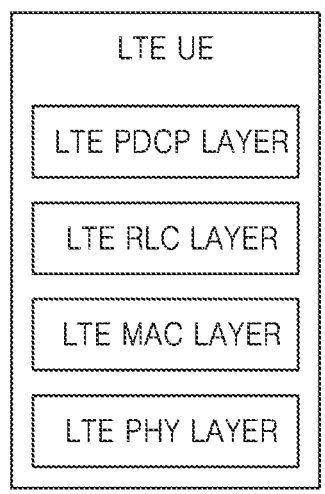
FIG. 1A illustrates LTE user plane protocol stack.

Accordingly, the embodiments herein disclose a method for handling PDCP operation in a wireless communication system. The method includes receiving, by an E-UTRA-NR Dual Connectivity (EN-DC) capable User Equipment (UE), a handover message from a LTE node. The handover message incudes an indication indicating a PDCP version change from a LTE PDCP to a NR PDCP. Further, the method includes indicating, by the EN-DC capable UE, the indication from a LTE RRC entity of the UE to a LTE PDCP entity of the UE. Further, the method includes receiving LTE PDCP PDUs from a LTE RLC entity by a receiver LTE PDCP entity of the EN-DC capable UE upon re-establishing the LTE RLC entity based on the indication. Further, the method includes processing, by the EN-DC capable UE, the LTE PDCP PDUs at the receiver LTE PDCP entity using a LTE format. Further, the method includes reestablishing, by the EN-DC capable UE, the receiver LTE PDCP entity and a transmitter LTE PDCP entity of the UE. Further, the method includes re-transmitting, by the EN-DC capable UE, the PDCP SDUs by the transmitter NR PDCP entity using a NR format. Further, the method includes processing, by the EN-DC capable UE, PDCP PDUs received by the receiver NR PDCP entity and PDCP SDUs received by the transmitter NR PDCP entity based on a NR PDCP operation.

In an embodiment, the receiver LTE PDCP entity is configured to process the received LTE PDCP PDUs from the LTE RLC by performing integrity check of the received LTE PDCP PDUs based on a configured LTE integrity procedure, separating a PDCP header and a PDCP payload of the received LTE PDCP PDUs, decrypting the PDCP payload based on a configured LTE encryption procedure, decompressing the PDCP header based on a LTE operation, processing the PDCP header based on a LTE format, and delivering the decrypted PDCP SDUs to upper layers.

In an embodiment, the receiver LTE PDCP entity and the transmitter LTE PDCP entity are re-established by indicating by the LTE PDCP entity to a NR PDCP entity to perform PDCP re-establishment procedure, performing a ROHC reset, deriving security keys, translating LTE PDCP state variables into NR PDCP state variables, and reestablishing the PDCP entity of the UE as the NR PDCP entity.

In an embodiment, the ROHC reset is performed if a drb-continue ROHC parameter is not configured.

In an embodiment, the integrity key is derived based on a configured NR integrity procedure, and the ciphering key is derived based on a NR encryption procedure.

In an embodiment, the LTE PDCP state variables are translated into the NR PDCP state variables based on one of a continuing sequence number (SN) parameter and a continuing COUNT parameter.

In an embodiment, re-transmitting the PDCP SDUs by the transmitter NR PDCP entity upon re-establishment using the NR format includes identifying the PDCP SDUs to be re-transmitted, processing the PDCP header of identified PDCP SDUs based on the NR format, compressing the PDCP header of identified PDCP SDUs based on the NR operation, performing integrity check of the NR PDCP PDU by calculating the MAC-I based on configured NR integrity procedure, encrypting the PDCP payload based on a configured NR encryption procedure, and delivering the encrypted NR PDCP PDUs to LTE RLC entity for transmission.

In an embodiment, the re-established receiver NR PDCP entity is configured to process the received NR PDCP PDUs from the LTE RLC by performing integrity check of the received NR PDCP PDUs based on configured NR integrity procedure, separating the PDCP header and payload of the received NR PDCP PDUs, decrypting the PDCP payload based on a configured NR encryption procedure, decompressing the PDCP header based on the NR operation, processing the PDCP header based on a NR format, performing duplicate detection by identifying duplicate PDCP SDUs and discarding the identified duplicate PDCP SDUs, performing reordering function on the processed PDCP SDUs, and delivering the decrypted PDCP SDUs to upper layers.

Accordingly, the embodiments herein disclose a method for handling PDCP operation in a wireless communication system. The method includes receiving, by an EN-DC capable UE, a handover message from a NR node. The handover message includes an indication indicating a PDCP version change from a NR PDCP to a LTE PDCP. Further, the method includes indicating, by the EN-DC capable UE, the indication from a RRC entity of the UE to a NR PDCP entity of the UE. Further, the method includes receiving, by the EN-DC capable UE, NR PDCP PDUs from the LTE RLC entity by the receiver NR PDCP entity upon re-establishing LTE RLC entity based on the indication. Further, the method includes processing, by the EN-DC capable UE, the NR PDCP PDUs at a receiver NR PDCP entity using a NR format. Further, the method includes reestablishing, by the EN-DC capable UE, the receiver NR PDCP entity of the UE and a transmitter NR PDCP entity of the UE. Further, the method includes re-transmitting the PDCP SDUs by a transmitter LTE PDCP entity of the EN-DC capable UE using a LTE format. Further, the method includes processing, by the EN-DC capable UE, PDCP PDUs received by the receiver LTE PDCP entity and PDCP SDUs received by the transmitter LTE PDCP entity based on a LTE PDCP operation.

In an embodiment, the receiver NR PDCP entity is configured to process the received NR PDCP PDUs from the LTE RLC by performing integrity check of the received NR PDCP PDUs based on a configured NR integrity procedure, separating the PDCP header and PDCP payload of the received NR PDCP PDUs, decrypting the PDCP payload based on configured NR encryption procedure, decompressing the PDCP header based on a NR operation, processing the PDCP header based on a NR format, performing duplicate detection by identifying duplicate PDCP SDUs and discarding the identified duplicate PDCP SDUs, performing reordering function on the processed PDCP SDUs, and delivering the decrypted PDCP SDUs to upper layers.

In an embodiment, the receiver NR PDCP entity of the UE and the transmitter NR PDCP entity of the UE are re-established by indicating by a NR PDCP entity to a LTE PDCP entity to perform PDCP re-establishment procedure, performing a ROHC reset, deriving security keys, translating NR PDCP state variables into LTE PDCP state variables, and reestablishing the PDCP entity of the UE as LTE PDCP entity.

In an embodiment, the ROHC reset is performed if a drb-continue ROHC parameter is not configured.

In an embodiment, the integrity key is derived based on a configured LTE integrity procedure, and the ciphering key is derived based on a LTE encryption procedure.

In an embodiment, the NR PDCP state variables are translated into the LTE PDCP state variables based on one of a continuing SN parameter and a continuing COUNT parameter.

In an embodiment, re-transmitting the PDCP SDUs by the transmitter LTE PDCP entity upon re-establishment using the LTE format includes identifying the PDCP SDUs to be re-transmitted, processing the PDCP header of identified PDCP SDUs based on a LTE format, compressing the PDCP header of identified PDCP SDUs based on a LTE operation, performing integrity check of the LTE PDCP PDU by calculating the MAC-I based on configured LTE integrity procedure, encrypting the PDCP payload based on configured LTE encryption procedure, and delivering the encrypted LTE PDCP PDUs to LTE RLC entity for transmission.

In an embodiment, the re-established receiver LTE PDCP entity is configured to process the received LTE PDCP PDUs from LTE RLC by performing integrity check of the received LTE PDCP PDUs based on a configured LTE integrity procedure, separating the PDCP header and payload of the received LTE PDCP PDUs, decrypting the PDCP payload based on a configured LTE encryption procedure, decompressing the PDCP header based on a LTE operation, processing the PDCP header based on a LTE format, and delivering the decrypted PDCP SDUs to upper layers.

Accordingly, the embodiments herein disclose an EN-DC capable UE for handling PDCP operation in a wireless communication system. The EN-DC capable UE includes a PDCP operation handler coupled with a memory and a processor. The PDCP operation handler is configured to receive a handover message from a LTE node. The handover message includes an indication indicating a PDCP version change from a LTE PDCP to a NR PDCP. The PDCP operation handler is configured to indicate the indication from a RRC entity of the UE to a LTE PDCP entity of the UE. Further, the PDCP operation handler is configured to receive LTE PDCP PDUs from the LTE RLC entity by the receiver LTE PDCP entity upon re-establishing LTE RLC entity based on the indication. Further, the PDCP operation handler is configured to process the LTE PDCP PDUs at the receiver LTE PDCP entity using a LTE format. Further, the PDCP operation handler is configured to reestablish the receiver LTE PDCP entity of the UE and a transmitter LTE PDCP entity of the UE. Further, the PDCP operation handler is configured to re-transmit the PDCP SDUs by the transmitter NR PDCP entity using a NR format. Further, the PDCP operation handler is configured to process PDCP PDUs received by the receiver NR PDCP entity and PDCP SDUs received by the transmitter NR PDCP entity based on a NR PDCP operation.

Accordingly, the embodiments herein disclose an EN-DC capable UE for handling PDCP operation in a wireless communication system. The EN-DC capable UE includes a PDCP operation handler coupled with a memory and a processor. The PDCP operation handler is configured to receive a handover message from a NR node. The handover message includes an indication indicating a PDCP version change from a NR PDCP to a LTE PDCP. Further, the PDCP operation handler is configured to indicate the indication from a RRC entity of the UE to a NR PDCP entity of the UE. Further, the PDCP operation handler is configured to receive NR PDCP PDUs from the LTE RLC entity by the receiver NR PDCP entity upon re-establishing LTE RLC entity based on the indication. Further, the PDCP operation handler is configured to process the NR PDCP PDUs at the receiver NR PDCP entity using a NR format. Further, the PDCP operation handler is configured to reestablish the receiver NR PDCP entity of the UE and a transmitter NR PDCP entity of the UE. Further, the PDCP operation handler is configured to re-transmit the PDCP SDUs by a transmitter LTE PDCP entity using a LTE format. Further, the PDCP operation handler is configured to process PDCP PDUs received by the receiver LTE PDCP entity and PDCP SDUs received by the transmitter LTE PDCP entity based on a LTE PDCP operation.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein. As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system is being developed to meet the growing demand for high speed data services, support ultra-reliability and low latency applications.

The fifth generation wireless communication system will be implemented not only in lower frequency bands but also in higher frequency (mmWave) bands, e.g., 10 GHz to 100 GHz bands, so as to accomplish higher data rates. In order to mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of an air-interface of the fifth generation wireless communication system would be flexible enough to serve the User Equipment (UEs) having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fourth generation wireless communication systems, the UE in a connected state communicates with an Enhanced Node B (eNB). A radio protocol stack for communication between the UE and the eNB comprises of Packet Data Convergence Protocol (PDCP), Radio link control (RLC), a Medium Access Control (MAC) and Physical (PHY) sub layers. One or more data radio bearers (DRBs) are established between the UE and the eNB for exchanging user plane packets. Each DRB is associated with one PDCP entity and one or more RLC entities. Each DRB is associated with a logical channel in the MAC sub layer. There is one MAC entity in the UE for the eNB.

The main services and functions of the MAC sublayer include: mapping between logical channels and transport channels, Multiplexing/de-multiplexing of MAC SDUs belonging to one or different logical channels into/from transport blocks (TB) delivered to/from the physical layer on the transport channels, scheduling information reporting, error correction through Hybrid automatic repeat request (HARQ), priority handling between the logical channels of one UE, priority handling between the UEs by means of dynamic scheduling, transport format selection and padding. In the New Radio (NR) MAC the priority handling between the logical channels is associated with the numerology supported and configured for one UE.

The main services and functions of the RLC sublayer include: transfer of upper layer PDUs, error correction through ARQ (only for Acknowledged Mode (AM) data transfer), concatenation, segmentation and reassembly of RLC SDUs (only for Un-acknowledgement Mode (UM) and AM data transfer), re-segmentation of the RLC data PDUs (only for the AM data transfer), reordering of the RLC data PDUs (only for the UM and AM data transfer), duplicate detection (only for the UM and AM data transfer), protocol error detection (only for the AM data transfer), the RLC SDU discard (only for the UM and AM data transfer), and RLC re-establishment. The concatenation function is absent in the NR RLC sub-layer.

Functions of the RLC sub layer are performed by the RLC entities. The RLC entity can be configured to perform the data transfer in one of the following three modes: Transparent Mode (TM), Unacknowledged Mode (UM), and Acknowledged Mode (AM). Consequently, the RLC entity is categorized as a TM RLC entity, an UM RLC entity and an AM RLC entity depending on the mode of data transfer. The TM RLC entity is configured either as a transmitting TM RLC entity or a receiving TM RLC entity. The transmitting TM RLC entity receives RLC SDUs from an upper layer (i.e. PDCP) and sends RLC PDUs to its peer receiving the TM RLC entity via lower layers (i.e. MAC). The receiving TM RLC entity delivers the RLC SDUs to the upper layer (i.e. PDCP) and receives the RLC PDUs from its peer transmitting the TM RLC entity via the lower layers (i.e. MAC).

Further, the UM RLC entity is configured either as a transmitting UM RLC entity or a receiving UM RLC entity. The transmitting UM RLC entity receives the RLC SDUs from the upper layer and sends the RLC PDUs to its peer receiving UM RLC entity via the lower layers. The receiving UM RLC entity delivers the RLC SDUs to the upper layer and receives the RLC PDUs from its peer transmitting the UM RLC entity via the lower layers. The AM RLC entity consists of a transmitting side and a receiving side. The transmitting side of the AM RLC entity receives the RLC SDUs from the upper layer and sends the RLC PDUs to its peer AM RLC entity via the lower layers. The receiving side of the AM RLC entity delivers the RLC SDUs to the upper layer and receives the RLC PDUs from its peer AM RLC entity via the lower layers.

The main services and functions of the PDCP sublayer for the user plane include: header compression and decompression: ROHC only, transfer of user data, in-sequence delivery of the upper layer PDUs at PDCP re-establishment procedure for RLC AM, For split bearers in the DC (only support for the RLC AM): PDCP PDU routing for transmission and PDCP PDU reordering for reception, duplicate detection of the lower layer SDUs at the PDCP re-establishment procedure for the RLC AM, retransmission of the PDCP SDUs at handover and, for split bearers in DC, of PDCP PDUs at PDCP data-recovery procedure, for RLC AM, ciphering and deciphering, and timer-based SDU discard in an uplink (UL). In NR PDCP, the reordering and duplicate detection are permanent functions. Further, the NR PDCP supports packet duplication function if configured by the RRC. Functions of the PDCP sub layer are performed by the PDCP entities. Each PDCP entity carries the data of one radio bearer. Due to the UE mobility, the UE may handover from one eNB to another eNB. In dual connectivity (DC) mode of operation due to UE mobility, the UE may handover from one MeNB to another MeNB or SCG change from one SeNB to another SeNB. The eNB may support multiple cells and the UE may also handover from one cell to another cell of same eNB.

In the fourth generation wireless communication system like LTE, the handover between two enhanced nodeBs (eNBs) or base stations for AM data radio bearers (DRBs) is lossless.

After the handover, the user plane protocols for the DRBs configured with the RLC layer in the AM mode are handled as follows in a legacy system: a PDCP SN is maintained on a bearer basis; a source eNB informs the target eNB about the next DL PDCP SN to allocate to a packet which does not have a PDCP sequence number yet (either from the source eNB or from a serving gateway); For security synchronization, a Hyper Frame Number (HFN) is also maintained; the source eNB provides to the target one reference HFN for the UL and one for the DL i.e., HFN and corresponding SN; Security keys are refreshed; the UE sends PDCP status report to the target eNB if the PDCP is configured by the target eNB. The configuration to send status report is per bearer; the target eNB may send the PDCP status report to the UE and the UE does not need to wait to resume UL transmission; the UE re-transmits in the target eNB or the target cell, all uplink PDCP SDUs starting from the first PDCP SDU following the last consecutively confirmed PDCP SDU i.e., the oldest PDCP SDU that has not been acknowledged at the RLC in the source, excluding the PDCP SDUs of which the reception is acknowledged through the PDCP SN based reporting by the target eNB. In the NR system, the PDCP re-establishment for AM DRBs during handover is similar to the legacy system except instead of maintaining the PDCP SN and HFN, the COUNT is maintained on a bearer basis; a source gNB informs the target eNB about the next DL PDCP COUNT to allocate to a packet which does not have a PDCP COUNT yet (either from the source gNB or from a User Plane Function (UPF). The target eNB re-transmits and prioritizes all downlink PDCP SDUs forwarded by the source eNB (i.e., the target eNB should send data with the PDCP SNs from X2 before sending data from S1), with the exception of the PDCP SDUs of which the reception is acknowledged through the PDCP SN based reporting by the UE; the ROHC is reset; and the RLC/MAC is reset. The PDCP PDUs stored in the PDU reordering buffer are deciphered and decompressed and kept in the PDCP, associated with COUNT.

Alternately, after the handover the user plane protocols for DRBs configured with RLC in the UM mode are handled as follows in legacy system: the PDCP SN is reset; the HFN is reset; the security keys are refreshed; No PDCP status report is transmitted; No PDCP SDUs are retransmitted in the target eNB; The UE PDCP entity does not attempt to retransmit any PDCP SDU in the target cell for which transmission had been completed in the source cell. Instead UE PDCP entity starts the transmission with other PDCP SDUs; ROHC is reset; and RLC/MAC is reset. In the NR system, the PDCP re-establishment for UM DRBs during handover is similar to the legacy system i.e. PDCP COUNT is reset. The user plane protocol of LTE from UE perspective is shown in FIG. 1A.

In the fifth generation wireless communication system, the concept of QoS flows replacing the EPS bearer concept in the core network is introduced. This means the user plane between the gNB and the gateway is based on the QoS flow instead of the S1-U bearer in the LTE system. For the particular, there can be one or more QoS flows between the gNB and the data gateway (i.e UPF) depending on the characteristics of the application/service and the QoS handling of the traffic. The EPS bearer handles all the user packets mapped to the EPS bearer with the same QoS. Within the EPS bearer, there is no further differentiated handling of the user plane packets. The QoS flow concept of the 5G system overcomes this drawback of the EPS bearer concept of the LTE system. The packets mapped to the different QoS flows belonging to the UE traffic can be handled differently. To achieve the same differentiated handling in the LTE system, multiple EPS bearers with different QoS parameters need to be created. In the 5G system, all the different QoS flows of the UE are handled by the PDU session between the g/NB and the data gateway (i.e. UPF). The UE may have more than one PDU session depending on the number of the PDN connections. However, for one PDN connection one PDU session is created. At high level, the PDU session can be analogous with the EPS bearer in the LTE system.

Figure 1B:
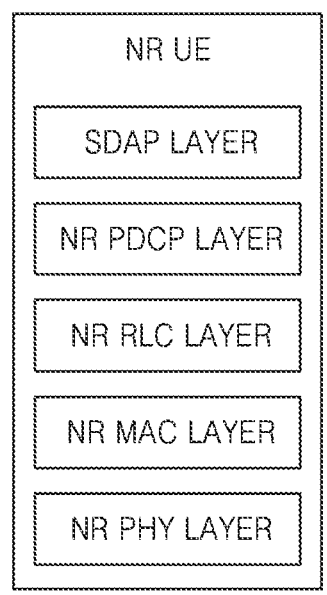
FIG. 1B illustrates NR user plane protocol stack.

However, on the radio interface, the 5G system has retained the DRB concept for user plane handling. This requires that the one or more QoS flows belonging to the PDU session of the UE is mapped to the DRB depending on the QoS requirement. The mapping of the QoS flow to the DRB is done in the RAN node i.e. the gNB within the new user plane protocol layer called SDAP (Service Data Adaptation Protocol) layer which is placed above the PDCP. The SDAP entities are located in the SDAP sublayer. Several SDAP entities may be defined for the UE. There is the SDAP entity configured per cell group for each individual PDU session. The SDAP entity in the SDAP sublayer performs mapping between the QoS flow and the data radio bearer for both the DL and the UL. The user plane protocol of 5G from UE perspective is shown in FIG. 1B respectively.

Multi-RAT Dual Connectivity (MR-DC) is a generalization of the Intra-E-UTRA Dual Connectivity (DC) described in 3GPP TS 36.300, where a multiple Rx/Tx UE may be configured to utilize radio resources provided by two distinct schedulers in two different nodes connected via non-ideal backhaul, one providing E-UTRA access and the other one providing NR access. One scheduler is located in the master node (MN) and the other in the secondary (SN). The MN and SN are connected via a network interface and at least the MN is connected to the core network.

Figure 2A:
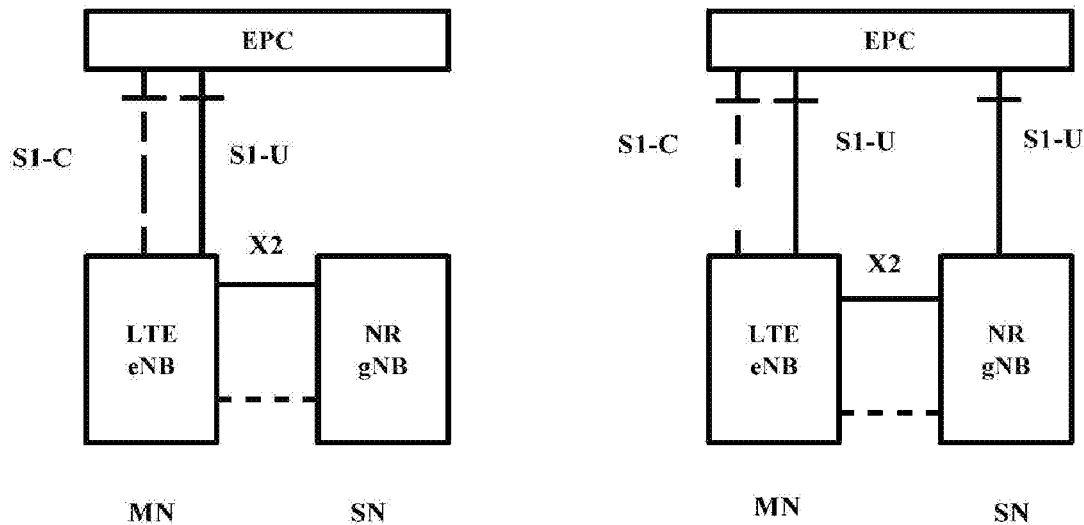
FIG. 2A illustrates EN-DC architecture.

As described in 3GPP TS 37.340, E-UTRAN supports MR-DC via E-UTRA-NR Dual Connectivity (EN-DC), in which a UE is connected to one LTE eNB that acts as a MN and one NR gNB that acts as a SN as shown in FIG. 2A. The MN i.e. LTE eNB is connected to the EPC and the SN i.e. NR gNB is connected to the MN i.e. LTE eNB via the X2 interface.

Figure 2B:
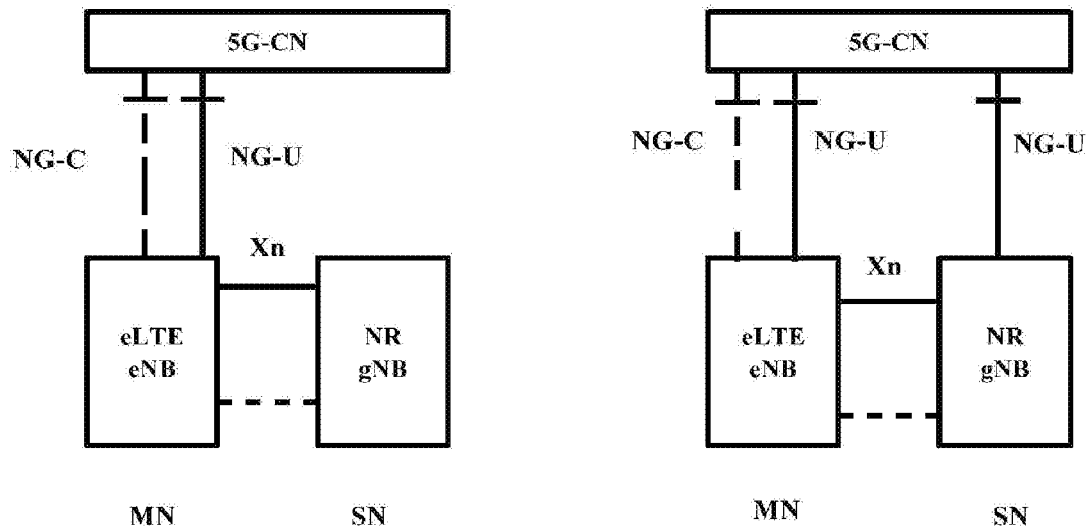
FIG. 2B illustrates NGEN-DC architecture.

NG-RAN supports NG-RAN E-UTRA-NR Dual Connectivity (NGEN-DC), in which a UE is connected to one LTE eNB that acts as a MN and one NR gNB that acts as a SN as shown in FIG. 2B. The LTE eNB is connected to the 5G-Core (5G-CN) and the NR gNB is connected to the MN i.e. LTE eNB via the Xn interface.

Figure 2C:
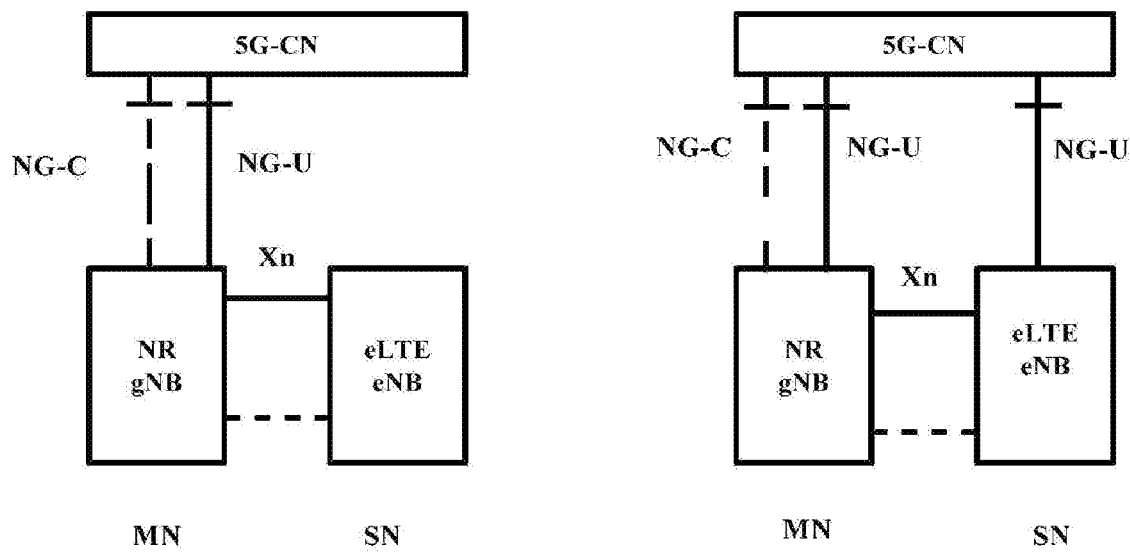
FIG. 2C illustrates NE-DC architecture.

NG-RAN supports NR-E-UTRA Dual Connectivity (NE-DC), in which a UE is connected to one NR gNB that acts as a MN and one LTE eNB that acts as a SN as shown in FIG. 2C. The NR gNB is connected to the 5G-Core and the LTE eNB is connected to the MN i.e. NR gNB via the Xn interface.

Figure 2D:
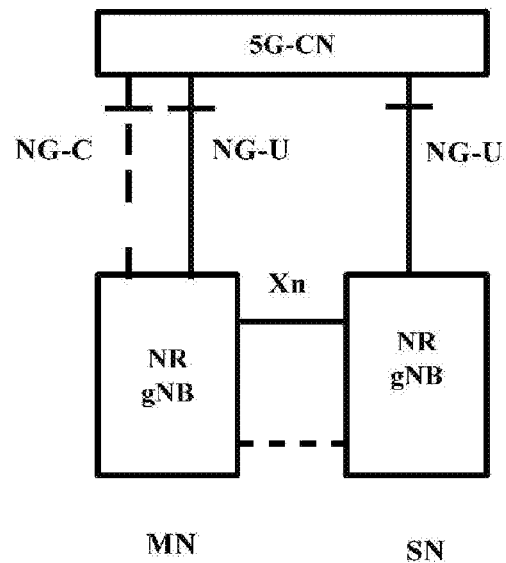
FIG. 2D illustrates NR-NR DC architecture.

NG-RAN supports NR-NR Dual Connectivity (NR-NR DC), in which a UE is connected to one NR gNB that acts as a MN and another NR gNB that acts as a SN as shown in FIG. 2D. The NR gNB is connected to the 5G-Core and the other NR gNB is connected to the MN via the Xn interface.

Figure 3A:
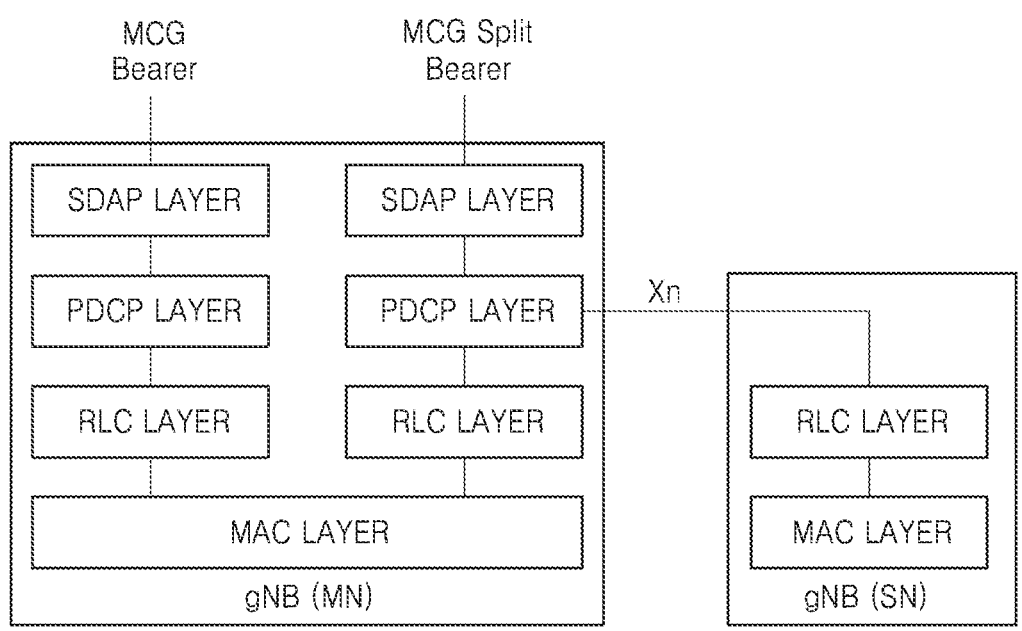
FIG. 3A illustrates MCG and MCG split bearer architecture.
Figure 3B:
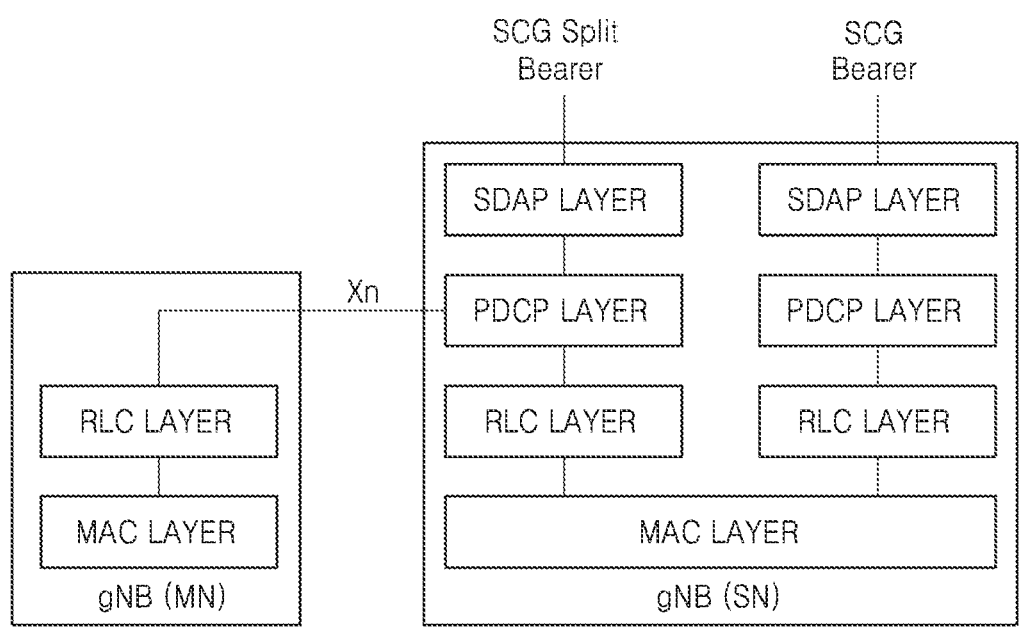
FIG. 3B illustrates SCG and SCG split bearer architecture.

In MR-DC, the radio protocol architecture that a particular radio bearer uses depends on how the radio bearer is setup. Four bearer types exist: MCG bearer, MCG split bearer, SCG bearer and SCG split bearer. These four bearer types are depicted in FIG. 3a and FIG. 3b assuming the NR user plane protocol stack. In the Figures below when the LTE eNB is MN and connected EPC i.e. EN-DC, the SDAP layer is not present in the user plane protocol stack. The MCG bearer can be configured with either LTE PDCP or NR PDCP while the MCG Split bearer, SCG Split bearer and SCG bearer is configured with NR PDCP. However when the eLTE eNB is MN and connected to 5G-CN i.e. NGEN-DC, NE-DC and NR-NR DC, then the SDAP layer protocol stack is present. The MCG bearer, the MCG Split bearer, SCG Split bearer and SCG bearer is configured with NR PDCP.

Thus, it is desired to address the above mentioned disadvantages or other shortcomings or at least provide a useful alternative.

The embodiments herein disclose a method for handling PDCP operation in a wireless communication system. The method includes receiving, by an E-UTRA-NR Dual Connectivity (EN-DC) capable User Equipment (UE), a handover message from a LTE node. The handover message includes an indication indicating a PDCP version change from a LTE PDCP to a NR PDCP. Further, the method includes indicating, by the EN-DC capable UE, the indication from a RRC entity of the UE to a LTE PDCP entity of the UE. Further, the method includes receiving LTE PDCP PDUs from the LTE RLC entity by a receiver LTE PDCP entity of the EN-DC capable UE upon re-establishing a LTE RLC entity based on the indication. Further, the method includes processing, by the EN-DC capable UE, the LTE PDCP PDUs at the receiver LTE PDCP entity using a LTE format. Further, the method includes reestablishing, by the EN-DC capable UE, the receiver LTE PDCP entity and a transmitter LTE PDCP entity of the UE. Further, the method includes re-transmitting, by the EN-DC capable UE, the PDCP SDUs by the transmitter NR PDCP entity using a NR format. Further, the method includes processing, by the EN-DC capable UE, PDCP PDUs received by the receiver NR PDCP entity and PDCP SDUs received by the transmitter NR PDCP entity based on a NR PDCP operation. Unlike conventional methods and the systems, the proposed method can be used to support PDCP version change from LTE PDCP to NR PDCP and vice-versa using a modified PDCP re-establishment procedure. The proposed method can be used to support lossless transition for the PDCP version change i.e. LTE PDCP in the E-UTRA to NR PDCP in the NR radio access technology during the handover (e.g. from legacy LTE node connected to EPC to EN-DC capable LTE connected to EPC) and bearer reconfiguration (e.g. bearer reconfiguration of MCG bearer configured with LTE PDCP to MCG bearer configured with NR-PDCP). The proposed method can be used to support lossless transition for the PDCP version change i.e., NR PDCP in the NR radio access technology to LTE PDCP in E-UTRA during the handover (e.g. from EN-DC capable LTE connected to EPC to legacy LTE node connected to EPC). The proposed method can also support lossless transition for SN version change i.e., NR PDCP SN size in target is equal or greater than NR PDCP SN size in source. The terms LTE PDCP and E-UTRA PDCP are used interchangeably.

Bearer type harmonization introduced unified bearer concept and it allows greater deployment flexibility and to reduce the number of Bearer Type change options. As part of this feature the same PDCP protocol specification i.e. NR PDCP is used for DRBs for MCG split bearer, SCG split bearer and SCG bearer. The same is extended for MCG bearer also where the network (NW) can configure the MCG bearer either with NR PDCP or LTE PDCP during EN-DC or NGEN-DC operation or during CN-RAN deployment scenarios where an eNB is connected to a NextGen Core. There can be following possible scenarios where the PDCP version change can happen between the NR PDCP and the LTE PDCP for MCG bearer or standalone LTE bearer.

A) Bearer Type change (BTC): During EN-DC or MR-DC operation bearer type change for below cases can lead to PDCP version change if the MCG bearer is configured with the LTE PDCP:

a) MCG to/from MCG Split bearer
    b) MCG to/from SCG operation
    c) MCG to/from SCG split bearer For above scenarios of BTC, the first step is to perform PDCP version change if the MCG bearer is configured with LTE-PDCP through HO procedure involving PDCP re-establishment and PDCP re-configuration. In the second step, the desired BTC can be achieved with or without HO procedure.

B) Inter RAT handover can cause PDCP version change in below cases:

I. When EN-DC capable UE moves from legacy LTE to Rel-15 LTE node for EN-DC operation i.e. MCG bearer PDCP version change can happen when such bearer configured with LTE PDCP is not carrying VOIP packets (i.e. LTE PDCP to NR PDCP version change).

II. When EN-DC capable UE moves from Rel-15 LTE node supporting EN-DC operation to legacy LTE node i.e. MCG bearer PDCP version change can happen when such bearer is configured with NR PDCP (i.e. NR PDCP to LTE PDCP version change).

C) PDCP version change during EN-DC operation: During EN-DC operation, the NW can configure the MCG bearer either with LTE PDCP or NR PDCP. Based on NW deployment or requirements it can change the PDCP version for MCG bearer between the NR PDCP and the LTE PDCP. One such case is for bearer type changes, if the MCG DRB is configured with the NR PDCP, then direct change between the bearer types can be supported without any complexity or restriction. If the MCG DRB is configured as the LTE PDCP then then there can be impact on bearer type change as direct change between the bearer types e.g., MCG to SCG bearer or MCG to/from Split bearer cannot be supported with lossless transition.

All the above mentioned scenarios can be supported through handover procedure as it involves PDCP version change and security key change which requires PDCP re-establishment. The LTE PDCP and the NR PDCP even though quite similar in terms of functionality, there are still some differences in terms of e.g. supported PDCP SN size, state variables, reordering functionality, PDCP PDU size etc. In order to support lossless PDCP version change in either direction few restrictions are required to achieve PDCP version change with the PDCP re-establishment procedure which does not result in data loss. Further, there is small difference between the PDCP re-establishment due to version change and the PDCP re-establishment not involving version change in terms of RLC SDU handling. Therefore, when RRC triggers PDCP re-establishment then lower layers i.e. PDCP sub-layer should be aware whether the re-establishment involves version change or without version change. NR PDCP procedures and state variables are based on COUNT value instead of sequence number (SN). The COUNT value is composed of a HFN and the PDCP SN. The size of the HFN part in bits is equal to 32 minus the length of the PDCP SN. The SN supported in NR is 12 and 18 bit. All NR PDCP state variables are based on COUNT.

a) TX_NEXT: This state variable indicates the COUNT value of the next PDCP SDU to be transmitted. The initial value is 0. The receiving PDCP entity shall maintain the following state variables:

b) RX_NEXT: This state variable indicates the COUNT value of the next PDCP SDU expected to be received. The initial value is 0.

c) RX_DELIV: This state variable indicates the COUNT value of the last PDCP SDU delivered to the upper layers. The initial value is 232— d) RX_REORD: This state variable indicates the COUNT value following the COUNT value associated with the PDCP Data PDU which triggered t-Reordering.

LTE PDCP procedures and state variables are based on PDCP SN and HFN. In LTE for ciphering and integrity a COUNT value is maintained. The COUNT value is composed of a HFN and the PDCP SN. The length of the PDCP SN is configured by upper layers which can be of size 7, 12, 15, 18 bit. The size of the HFN part in bits is equal to 32 minus the length of the PDCP SN. The various state variables in LTE is mentioned as below.

A) Next_PDCP_TX_SN: The variable Next_PDCP_TX_SN indicates the PDCP SN of the next PDCP SDU for a given PDCP entity. At establishment of the PDCP entity, the UE shall set Next_PDCP_TX_SN to 0.

B) TX_HFN: The variable TX_HFN indicates the HFN value for the generation of the COUNT value used for PDCP PDUs for a given PDCP entity. At establishment of the PDCP entity, the UE shall set TX_HFN to 0. The receiving side of each PDCP entity shall maintain the following state variables:

C) Next_PDCP_RX_SN: The variable Next_PDCP_RX_SN indicates the next expected PDCP SN by the receiver for a given PDCP entity. At establishment of the PDCP entity, the UE shall set Next_PDCP_RX_SN to 0.

D) RX_HFN: The variable RX_HFN indicates the HFN value for the generation of the COUNT value used for the received PDCP PDUs for a given PDCP entity. At establishment of the PDCP entity, the UE shall set RX_HFN to 0.

E) Last_Submitted_PDCP_RX_SN: For PDCP entities for DRBs mapped on RLC AM the variable Last_Submitted_PDCP_RX_SN indicates the SN of the last PDCP SDU delivered to the upper layers. At establishment of the PDCP entity, the UE shall set Last_Submitted_PDCP_RX_SN to Maximum_PDCP_SN.

F) Reordering_PDCP_RX_COUNT: This variable is used only when the reordering function is used. This variable holds the value of the COUNT following the COUNT value associated with the PDCP PDU which triggered t-Reordering. In summary the difference between LTE and PDCP is as below shown in Table 1.

TABLE 1

|  | LTE | NR |
|---|---|---|
| PDCP SN Size for SRB | 5 bits | 12 bits |
| PDCP SN Size for DRB | 7/12/15/18 bits | 12/18 bits |
| UP integrity | Not supported | Supported |
| UP Duplication | Not supported | Supported |
| PDCP Variable | SN | COUNT |
| Maximum SDU | 8188 bytes | Up to jumbo frame (9 KB) |
| T-reordering | Only for split bearer | Always(by configuration) |

Referring now to the drawings, and more particularly to FIGS. 4 through 11, where similar reference characters denote corresponding features consistently throughout the figures, there are shown preferred embodiments.

Figure 4:
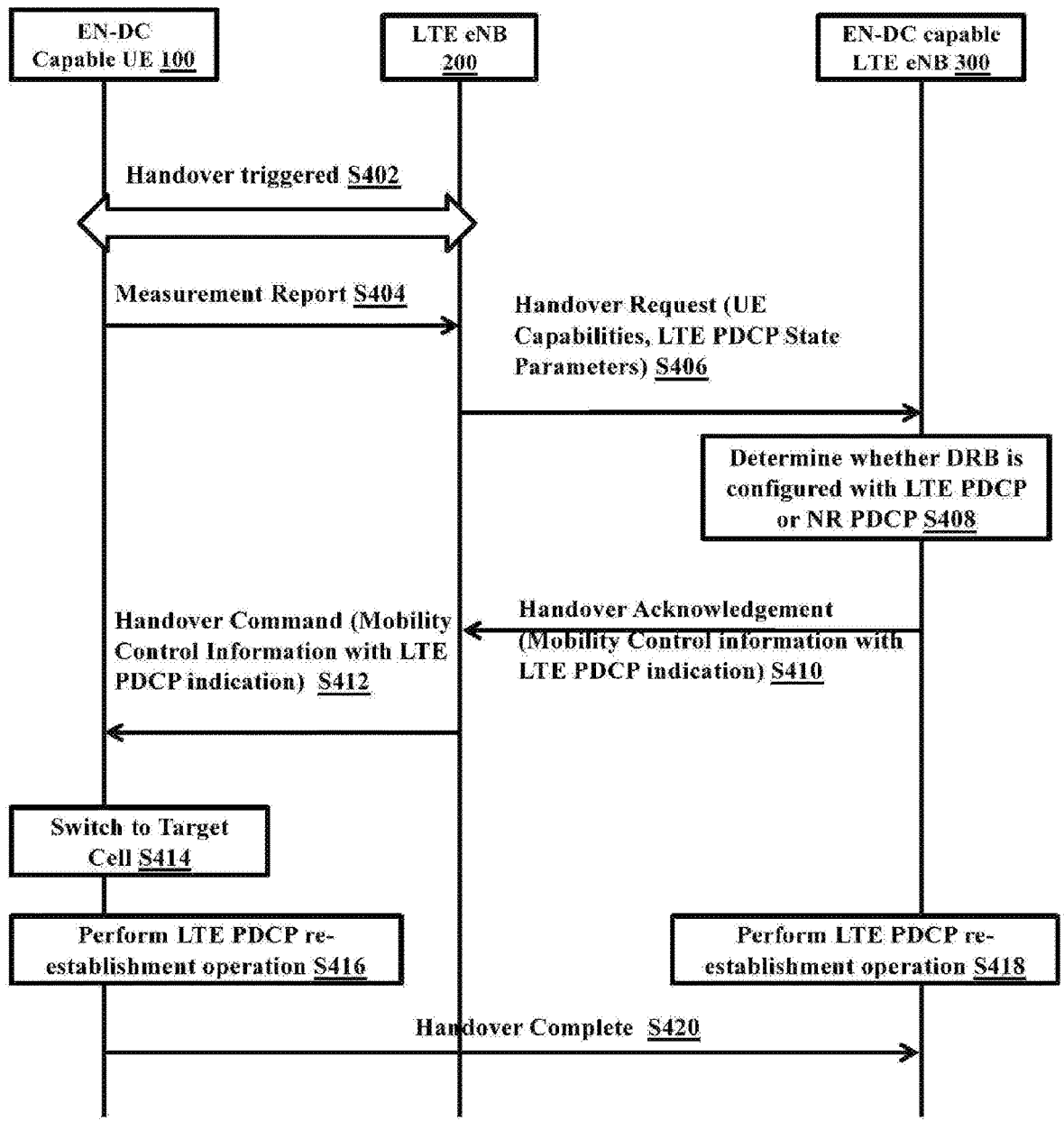
FIG. 4 is a sequence diagram illustrating various steps involved during handover from LTE to EN-DC capable node, according to an embodiment as disclosed herein.

FIG. 4 is a sequence diagram illustrating various steps involved during a handover from the LTE node (e.g., LTE eNB 200) to EN-DC capable node (i.e., EN-DC capable LTE eNB 300), according to an embodiment as disclosed herein.

At S402, the handover is triggered between the EN-DC capable UE 100 and the LTE eNB 200. At S404, the EN-DC capable UE 100 sends the measurement report to the LTE eNB 200. At S406, LTE eNB 200 sends the handover request message including the UE Capabilities and LTE PDCP state parameters to the EN-DC capable LTE eNB 300.

The EN-DC capable LTE eNB 300 determines whether DRB is configured with LTE PDCP or NR PDCP at S408. The EN-DC capable LTE eNB 300 sends the handover acknowledgement message including the mobility control information with LTE PDCP indication to the LTE eNB 200 at S410. The LTE eNB 200 sends the handover command message including the mobility control information with LTE PDCP indication to the EN-DC Capable UE 100 at S412. The EN-DC capable UE 100 switches to target cell at S414. The EN-DC capable UE 100 performs the LTE PDCP re-establishment operation at S416 and the EN-DC capable LTE eNB 300 performs the LTE PDCP re-establishment operation at S418. At S420, the handover complete between the EN-DC Capable UE 100 and the EN-DC capable LTE eNB 300.

Specifically, the FIG. 4 depicts the handover of the UE 100 connected to the legacy LTE node towards Rel-15 LTE node which is EN-DC capable. On the X2 interface the source i.e. LTE eNB 200 sends the handover request message to the target i.e. EN-DC capable LTE eNB 300 at. The HO request message includes HandoverPreparationInformation comprising the as-Config, rrm-Config, ue-RadioAccessCapabilityInfo, as-Context etc. The ue-RadioAccessCapabilityInfo indicates the UE capabilities i.e. the UE 100 is EN-DC capable and the as-Config includes the LTE PDCP state parameters like Next_PDCP_TX_SN, TX_HFN, Next_PDCP_RX_SN, RX_HFN, Last_Submitted_PDCP_RX_SN and Reordering_PDCP_RX_COUNT. Based on the information provided in the HandoverPreparationInformation the target decides whether the DRBs of the UE 100 undergoing handover should be configured with LTE PDCP or NR PDCP. If the DRBs of the UE 100 need to be configured with NR PDCP then this involves PDCP version change comprising the translation of LTE PDCP state parameters sent by the source into NR PDCP parameters. The UE 100 also needs to be informed whether it continues with LTE PDCP in the target or whether it needs to perform PDCP version change. This is indicated to the UE 100 by the target cell through the RRC container included in the Handover Acknowledgement message sent to the source on the X2 interface. The source forwards the RRC container received from the target which includes the mobility control information to the UE 100. In FIG. 4 it is shown the UE 100 does not receive the PDCP version change indication i.e. UE 100 shall establish the DRBs in the target based on the LTE PDCP. As shown in the FIG. 4, when the UE 100 receives the HO message, the explicit indication concerning PDCP version change is not included for the drb-identity which is part of current UE configuration. This indicates it is PDCP re-establishment without involving PDCP version change i.e. normal PDCP re-establishment. The UE RRC does not generate the indication to PDCP and normal LTE PDCP re-establishment is triggered.

Figure 5:
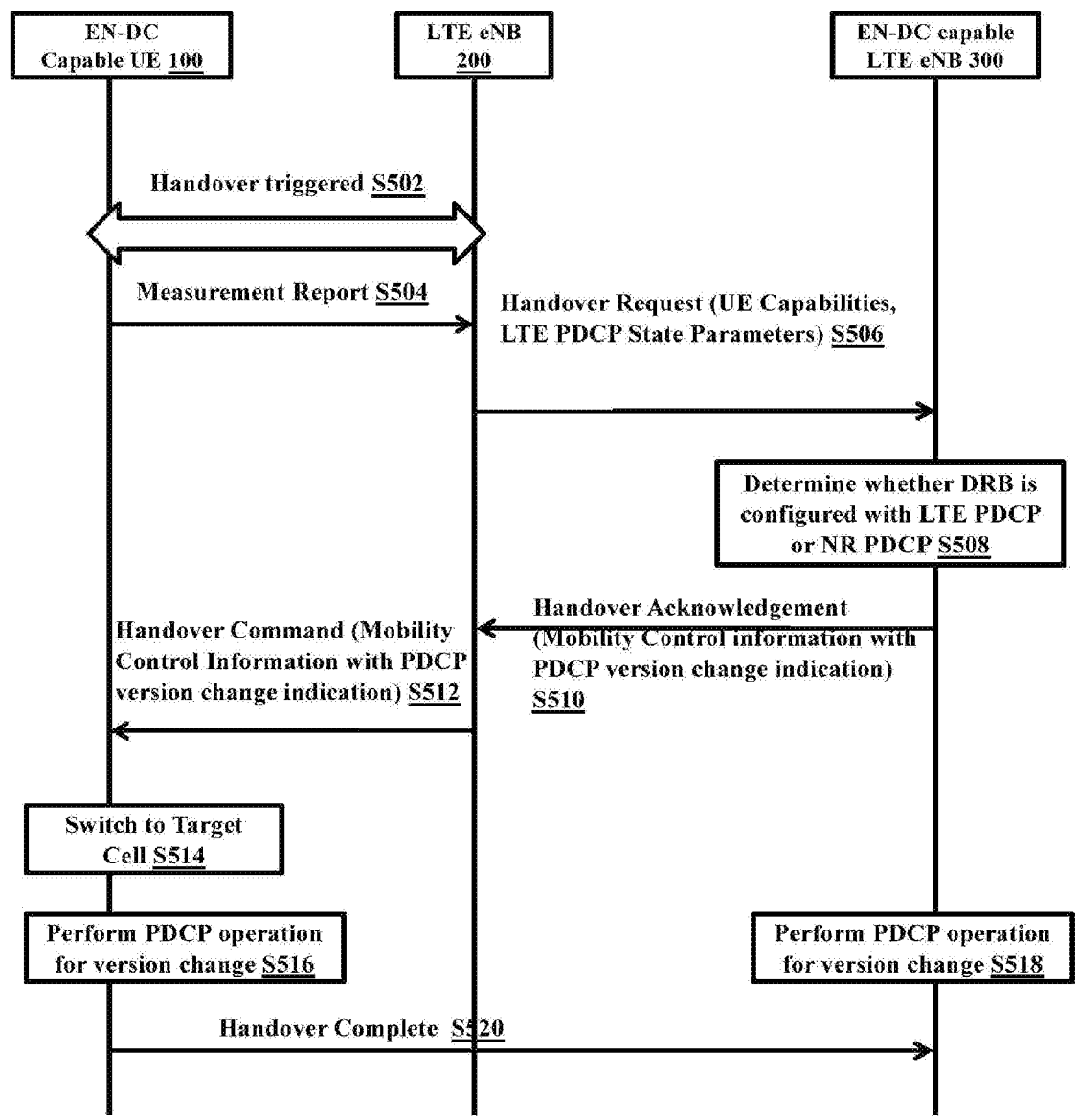
FIG. 5 is a sequence diagram illustrating various steps involved during handover from LTE to EN-DC capable node, according to another embodiment as disclosed herein.

FIG. 5 is a sequence diagram illustrating various steps involved during handover from the LTE eNB 200 to the EN-DC capable LTE eNB 300, according to another embodiment.

At S502, the handover is triggered between the EN-DC capable UE 100 and the LTE eNB 200. At S504, the EN-DC capable UE 100 sends the measurement report to the LTE eNB 200. At S506, LTE eNB 200 sends the handover request message including the UE Capabilities and LTE PDCP state parameters to the EN-DC capable LTE eNB 300.

The EN-DC capable LTE eNB 300 determines whether DRB is configured with LTE PDCP or NR PDCP at S508. The EN-DC capable LTE eNB 300 sends the handover acknowledgement message including the mobility control information with PDCP indication to the LTE eNB 200 at S510. The LTE eNB 200 sends the handover command message including the mobility control information with PDCP indication to the EN-DC Capable UE 100 at S512. The EN-DC capable UE 100 switches to target cell at S514. The EN-DC capable UE 100 performs the PDCP re-establishment operation at S516 and the EN-DC capable LTE eNB 300 performs the PDCP re-establishment operation at S518. At S520, the handover complete between the EN-DC Capable UE 100 and the EN-DC capable LTE eNB 300.

Specifically, in the FIG. 5, it is shown the UE 100 receives the PDCP version change indication i.e. UE 100 shall establish the DRBs in the target based on the NR PDCP. After receiving the HO command message i.e. RRC reconfiguration message including mobility control information the UE 100 either perform normal LTE PDCP re-establishment or the UE 100 performs the PDCP version change operation while re-establishing the PDCP. For the PDCP version change from the LTE PDCP to the NR PDCP, the NR PDCP SN size should be either equal or greater than the LTE PDCP SN size. Two methods are proposed in the present invention for the PDCP state parameter translation from the LTE to the NR which ensures the PDCP version change operation is lossless and the NR PDCP entities (i.e. PDCP TX/RX) entities at the EN-DC capable LTE node and the UE 100 can be re-established to ensure lossless data transmission and reception. As shown in FIG. 5, when the UE 100 receives the HO message, the explicit indication concerning PDCP version change is included for the drb-identity which is part of current UE configuration (i.e. to NR-PDCP). Alternatively, the HO message may include the implicit indication concerning PDCP version change for this drb-identity which is part of UE configuration based on the PDCP Configuration. This indicates it is PDCP re-establishment involving PDCP version change i.e. from LTE PDCP to NR PDCP. The UE RRC generates the indication to PDCP for this drb-identity and PDCP re-establishment is triggered involving version change.

Figure 6:
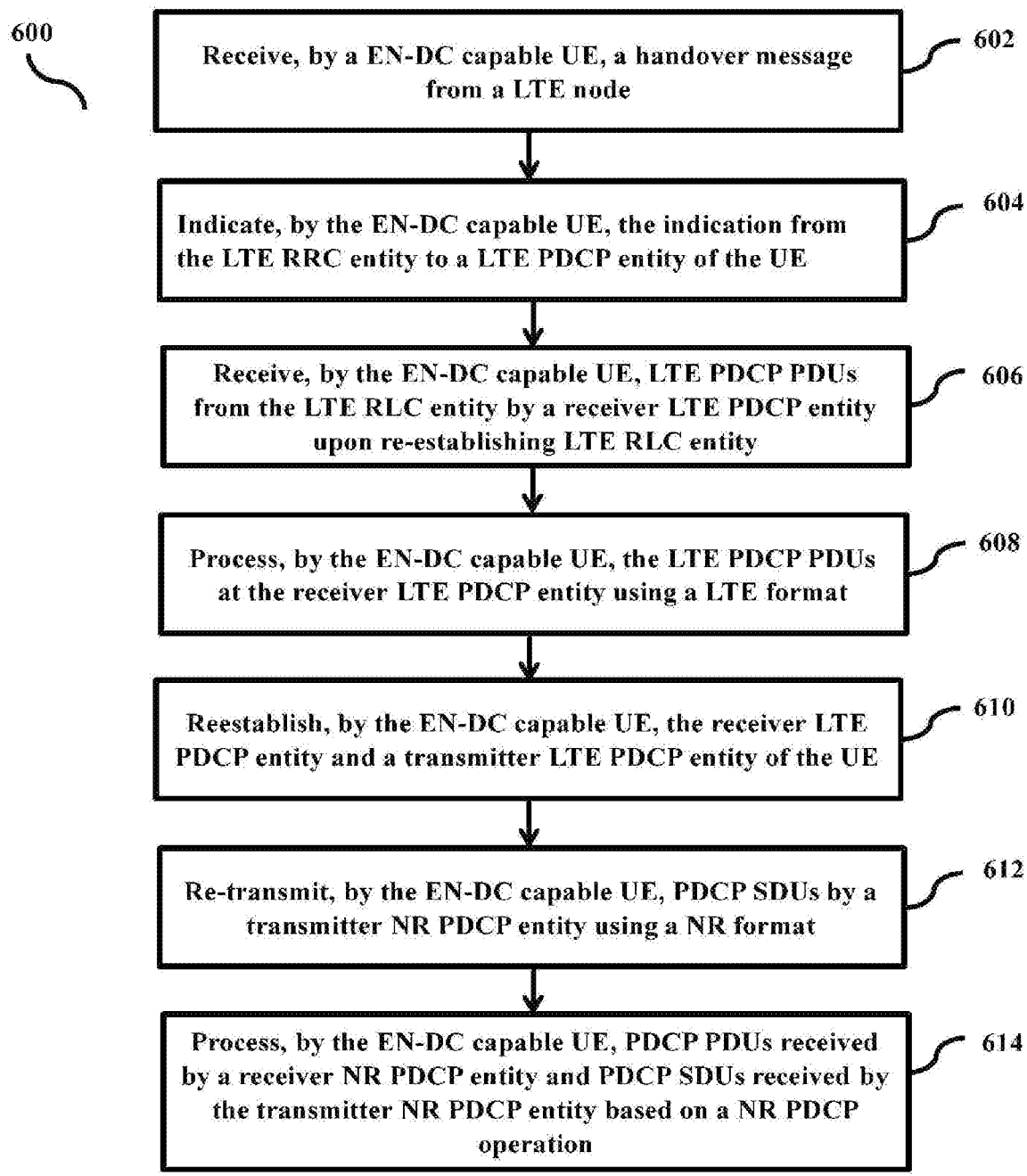
FIG. 6 is a flow diagram illustrating various steps involved during PDCP operation for version change (i.e., LTE to NR) and PDCP re-establishment, according to an embodiment as disclosed herein.

FIG. 6 is a flow diagram 600 illustrating various steps involved during PDCP operation for version change (LTE to NR) and PDCP re-establishment, according to an embodiment as disclosed herein. The operations (602-614) are performed by the PDCP operation handler. Initially, the UE 100 receives implicit/explicit indication for PDCP version change for concerned drb-id in the HO message.

At 602, the method includes receiving the handover message from the LTE node. The handover message includes the indication indicating the PDCP version change from the LTE PDCP to the NR PDCP. At 604, the method includes indicating the indication from the LTE RRC entity of the UE 100 to the LTE PDCP entity of the UE. At 606, the method includes receiving LTE PDCP PDUs from the LTE RLC entity by the receiver LTE PDCP entity upon re-establishing LTE RLC entity based on the indication. At 608, the method includes processing the LTE PDCP PDUs at the receiver LTE PDCP entity using a LTE format. At 610, the method includes reestablishing the receiver LTE PDCP entity as receiver NR PDCP entity and reestablishing a transmitter LTE PDCP entity as transmitter NR PDCP entity. At 612, the method includes re-transmitting PDCP SDUs by a re-established transmitter NR PDCP entity using a NR format. At 614, the method includes processing PDCP PDUs received by a receiver NR PDCP entity and PDCP SDUs received by the transmitter NR PDCP entity based on a NR PDCP operation.

Figure 7:
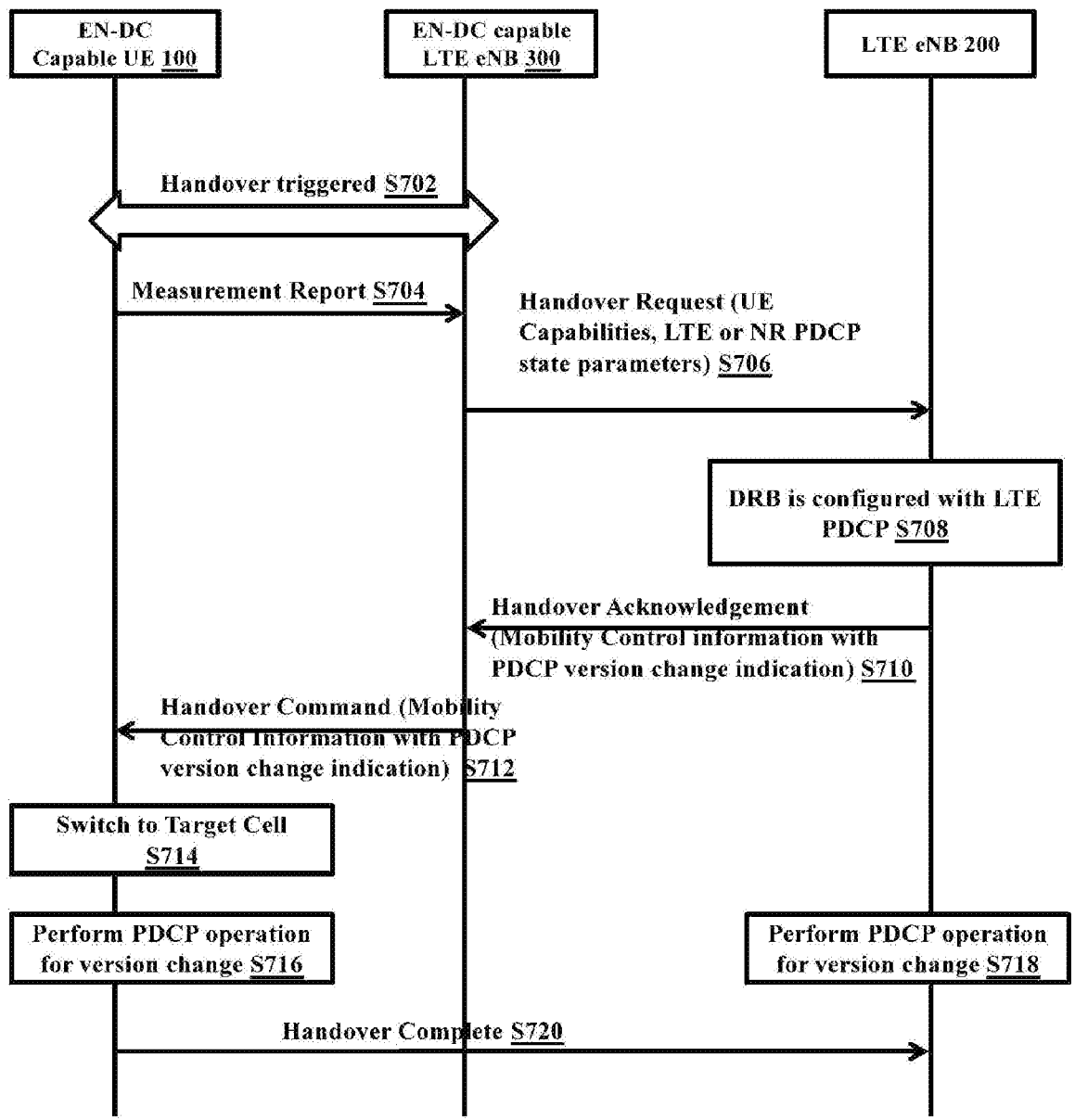
FIG. 7 is a sequence diagram illustrating various steps involved during handover of the UE connected to Rel-15 LTE node which is EN-DC capable towards legacy LTE node, according to an embodiment as disclosed herein.

FIG. 7 is a sequence diagram illustrating various steps involved during handover of the UE 100 connected to Rel-15 LTE node which is EN-DC capable towards legacy LTE node 200, according to an embodiment as disclosed herein.

At S702, the handover is triggered between the EN-DC capable UE 100 and the EN-DC capable LTE eNB 300. At S704, the EN-DC capable UE 100 sends the measurement report to the EN-DC capable LTE eNB 300. At S706, EN-DC capable LTE eNB 300 sends the handover request message including the UE capabilities and LTE or NR PDCP state parameters to the LTE eNB 200.

The LTE eNB 200 determines whether DRB is configured with LTE PDCP at S708. The LTE eNB 200 sends the handover acknowledgement message including the mobility control information with PDCP version change indication to the EN-DC capable LTE eNB 300 at S710. The EN-DC capable LTE eNB 300 sends the handover command message including the mobility control information with PDCP indication to the EN-DC capable UE 100 at S712. The EN-DC capable UE 100 switches to target cell at S714. The EN-DC capable UE 100 performs the PDCP re-establishment operation at S716 and the LTE eNB 300 performs the PDCP re-establishment operation at S718. At S720, the handover complete between the EN-DC Capable UE 100 and the LTE eNB 300.

Specifically, the FIG. 7 depicts the handover of the UE connected to Rel-15 LTE node which is EN-DC capable towards legacy LTE node. On the X2 interface the source i.e. EN-DC capable LTE eNB 300 sends the handover request message to the target i.e. LTE eNB 200. The HO request message includes HandoverPreparationInformation comprising the as-Config, rrm-Config, ue-RadioAccessCapabilityInfo, as-Context etc. The ue-RadioAccessCapabilityInfo indicates the UE capabilities i.e. the UE 100 is EN-DC capable and the as-Config includes the either LTE PDCP state parameters like Next_PDCP_TX_SN, TX_HFN, Next_PDCP_RX_SN, RX_HFN, Last_Submitted_PDCP_RX_SN and Reordering_PDCP_RX_COUNT or NR PDCP parameters like TX_NEXT, RX_NEXT, RX_DELIV and RX_REORD depending on whether the PDCP configuration of the DRB in the source.

Based on the information provided in the HandoverPreparationInformation the target decides the DRBs of the UE 100 undergoing handover should be configured with LTE PDCP regardless of the PDCP configuration of DRBs in the source. If the DRBs of the UE 100 was configured with NR PDCP in the source then this involves PDCP version change comprising the translation of NR PDCP state parameters sent by the source into LTE PDCP parameters otherwise the handover is like a normal LTE handover. The UE 100 also needs to be informed whether it needs to perform PDCP version change if NR PDCP was configured for the DRB in the source or it continues with LTE PDCP in the target. This is indicated to the UE 100 by the target cell through the RRC container included in the Handover Acknowledgement message sent to the source on the X2 interface. The source forwards the RRC container received from the target which includes the mobility control information to the UE. In FIG. 7 it is shown the UE 100 receives the PDCP version change indication i.e. UE 100 shall establish the DRBs in the target based on LTE PDCP. After receiving the HO command message i.e. RRC reconfiguration message including mobility control information the UE 100 either perform normal LTE PDCP re-establishment or the UE 100 performs PDCP version change operation (i.e. NR PDCP to LTE PDCP) while re-establishing the PDCP. For the PDCP version change from NR PDCP to LTE PDCP, the LTE PDCP SN size should be either equal or greater than the NR PDCP SN size. Two methods are proposed in the present disclosure for the PDCP state parameter translation from NR to LTE which ensures the PDCP version change operation is lossless and the LTE PDCP entities (i.e. PDCP TX/RX entities) at the target i.e. legacy LTE node and the UE 100 can be re-established to ensure lossless data transmission and reception.

Figure 8:
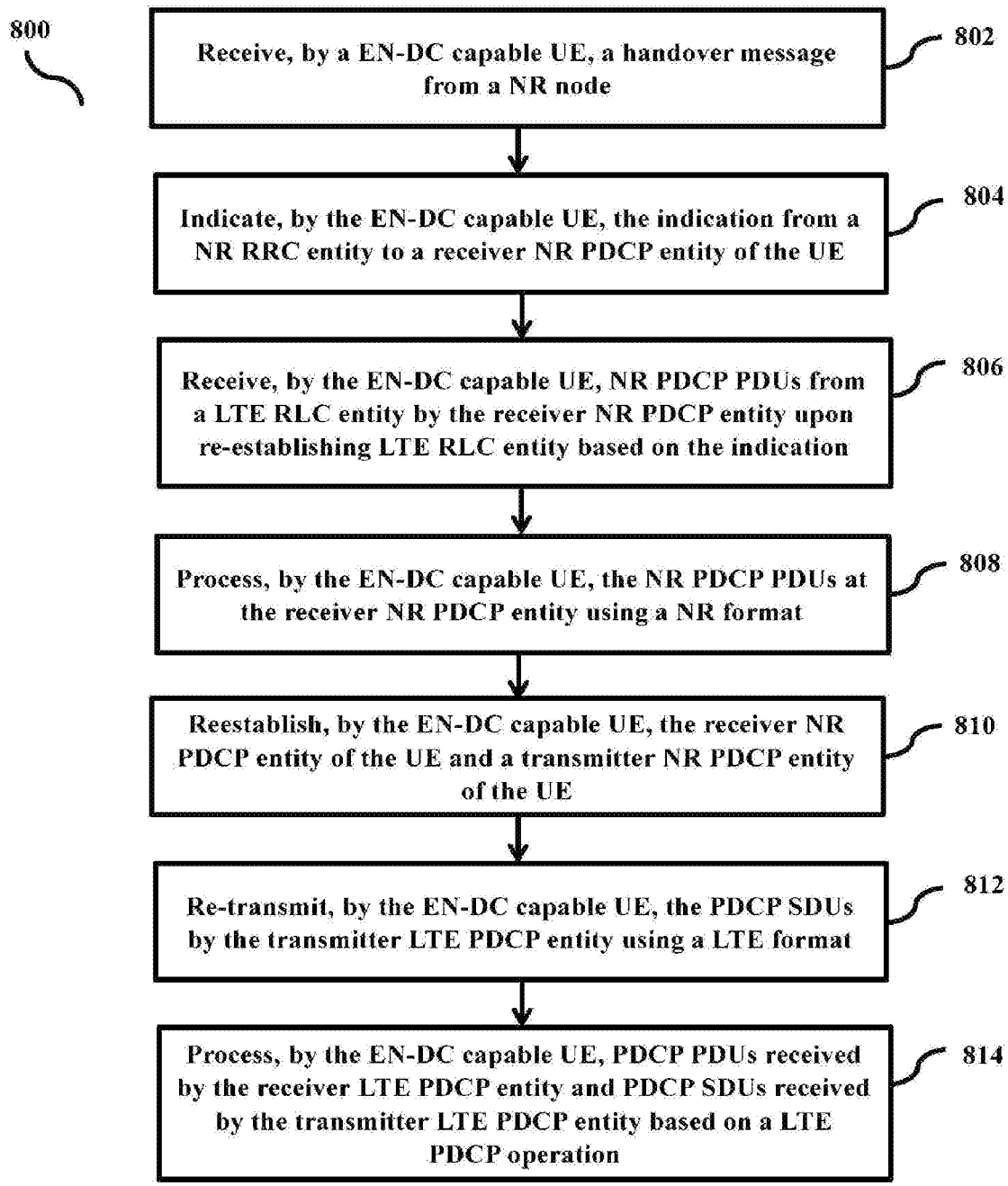
FIG. 8 is a flow diagram illustrating various steps involved during PDCP operation for version change (NR to LTE) and PDCP re-establishment, according to an embodiment as disclosed herein.

FIG. 8 is a flow diagram 800 illustrating various steps involved during PDCP operation for version change (NR to LTE) and PDCP re-establishment, according to an embodiment as disclosed herein. The operations (802-814) are performed by the PDCP operation handler. Initially, the UE 100 receives implicit/explicit indication for PDCP version change for concerned drb-id in the HO message. At 802, the method includes receiving the handover message from the NR node. The handover message includes the indication indicating the PDCP version change from the NR PDCP to the LTE PDCP. At 804, the method includes indicating the indication from the NR RRC entity of the UE 100 to the NR PDCP entity of the UE 100. At 806, the method includes receiving NR PDCP PDUs from the LTE RLC entity by the receiver NR PDCP entity upon re-establishing LTE RLC entity based on the indication. At 808, the method includes processing the NR PDCP PDUs at the receiver NR PDCP entity using a NR format. At 810, the method includes reestablishing the receiver NR PDCP entity as receiver LTE PDCP entity and reestablishing a transmitter NR PDCP entity as transmitter LTE PDCP entity. At 812, the method includes re-transmitting the PDCP SDUs by the transmitter LTE PDCP entity using the LTE format. At 814, the method includes processing PDCP PDUs received by the receiver LTE PDCP entity and PDCP SDUs received by the transmitter LTE PDCP entity based on a LTE PDCP operation.

Handover procedure in LTE and NR triggers PDCP re-establishment procedure. For AM bearers, the PDCP SN or count is maintained and header compression is reset. Once PDCP re-establishment is completed for AM DRBs, from the first PDCP SDU for which the successful delivery of the corresponding PDCP Data PDU has not been confirmed by lower layers, perform retransmission or transmission of all the PDCP SDUs already associated with PDCP SNs in ascending order of the COUNT values associated to the PDCP SDU prior to the PDCP entity re-establishment.

State variables are maintained during in the NR and the LTE PDCP re-establishment procedure.

Problem: During LTE PDCP to/from NR PDCP version change as state variables are different between NR and LTE, mapping between LTE and NR state variables to support lossless transition during version change is needed. The mapping method for the LTE to NR PDCP version changes when PDCP SN size is same in LTE and NR PDCP.

If the size of PDCP SN in the LTE PDCP and the NR PDCP is same (say Ni bits) then in case of change from LTE PDCP to NR PDCP, the NR PDCP state variables can be determined using the LTE state variables in the proposed methods as shown in Table 2 below. In Table 2 during the state variable translation the SN is maintained.

TABLE 2

| NR Parameters | Derivation of NR parameters from LTE parameters |
|---|---|
| TX_NEXT | Next_PDCP_TX_SN + TX_HFN ($2^{N1}$ * TX_HFN) + Next_PDCP_TX_SN where N1 is equal to size (in bits) of PDCP SN in LTE |
| RX_NEXT | Next_PDCP_RX_SN and RX_HFN ($2^{N1}$ * RX_HFN) + Next_PDCP_RX_SN where N1 is equal to size (in bits) of PDCP SN |
| RX_REORD | Need to calculate based on PDCP and RX_HFN of first received packet in DL |
| RX_DELIV | Last_Submitted_PDCP_RX_SN + RX_HFN ($2^{N1}$ * RX_HFN ) + Last_Submitted_PDCP_RX_SN where N1 is equal to size (in bits) of PDCP SN |

The parameters like RX_REORD is not required when NR to LTE PDCP version change takes place as LTE is not supporting reordering operation for MCG DRB or stand-alone LTE DRB but the same is required during LTE to NR as NR always supports reordering and this need to be calculated based on first received packet in DL.

Further, mapping method for NR PDCP to LTE PDCP version change are provided when PDCP SN size is same in LTE and NR PDCP. If the size of PDCP SN in LTE PDCP and NR PDCP is same (say Ni bits) then in case of change from NR PDCP to LTE PDCP, LTE PDCP state variables can be determined using the NR state variables in the proposed invention as shown in Table 3 below. In Table 2 during the state variable translation the SN is maintained.

TABLE 3

| LTE Parameters | Derivation of LTE parameters from NR parameters |
|---|---|
| Next_PDCP_TX_SN | value of N1 LSBs of TX_NEXT where N1 is equal to size (in bits) of PDCP SN |
| TX_HFN | value of N2 − N1 LSBs of TX_NEXT where N2 is equal to size (in bits) of COUNT |
| Next_PDCP_RX_SN | value of N1 LSBs of RX_NEXT where N1 is equal to size (in bits) of PDCP SN |

TABLE 3-continued

| LTE Parameters | Derivation of LTE parameters from NR parameters |
| --- | --- |
| RX_HFN | value of N2 – N1 LSBs of RX_NEXT where N2 is equal to size (in bits) of COUNT |
| Last_Submitted_PDCP_RX_SN | value of N1 LSBs of RX_DELIV where N1 is equal to size (in bits) of PDCP SN |
| Reordering_PDCP_RX_COUNT | value of RX_REORD |

Further, the mapping method for LTE to NR PDCP version change is provided when PDCP SN size in NR PDCP is greater than PDCP SN size in LTE PDCP. The UE 100 should initialize the HFN value to 0 during PDCP re-establishment procedure instead of maintaining the same and perform the below mapping procedure to determine the NR variables for lossless transition.

Calculate the TX_NEXT based on Next_PDCP_TX_SN and HFN=0. TX_NEXT=(2Y*HFN)+Next_PDCP_TX_SN where Y is equal to size (in bits) of PDCP SN in NR PDCP. In other words TX_NEXT is set to Next_PDCP_TX_SN.

Calculate the RX_NEXT based on Next_PDCP_RX_SN and HFN=0. RX_NEXT=(2Y*HFN)+Next_PDCP_RX_SN where Y is equal to size (in bits) of PDCP SN in NR PDCP. In other words RX_NEXT is set to Next_PDCP_RX_SN.

New value of RX_DELIV can be calculated based on Last_Submitted_PDCP_RX_SN and HFN=0. RX_DELIV=(2Y*HFN)+Last_Submitted_PDCP_RX_SN where Y is equal to size (in bits) of PDCP SN in NR PDCP. In other words RX_DELIV is set to Last_Submitted_PDCP_RX_SN.

Reordering_PDCP_RX_COUNT can be calculated based on first packet received from lower layers i.e., based on RX_NEXT.

PDCP status report will be prepared based on Last_Submitted_PDCP_RX_SN. During the above state variable translation the SN is maintained while COUNT is not maintained.

In an embodiment, this method can also be used when PDCP SN size in NR PDCP is equal to PDCP SN size in LTE PDCP.

Further, mapping method for NR to LTE PDCP version change is provided when PDCP SN size in LTE is greater than PDCP SN size in NR PDCP. The UE 100 should initialize the HFN value to 0 during PDCP re-establishment procedure instead of maintaining the same and perform the below mapping procedure to determine the LTE variables for lossless transition.

Set TX_HFN to 0. Set RX_HFN to 0.

Calculate the Next_PDCP_TX_SN from TX_NEXT (based on source SN length). Next_PDCP_TX_SN=value of Y LSBs of TX_NEXT where Y is equal to size (in bits) of PDCP SN in NR PDCP.

Calculate the Next_PDCP_RX_SN from RX_NEXT (based on source SN length). Next_PDCP_RX_SN=value of Y LSBs of RX_NEXT where Y is equal to size (in bits) of PDCP SN in NR PDCP.

Calculate Last_Submitted_PDCP_RX_SN from RX_DELIV (based on source SN length). Last_Submitted_PDCP_RX_SN=value of Y LSBs of RX_DELIV where Y is equal to size (in bits) of PDCP SN in NR PDCP.

Reordering_PDCP_RX_COUNT is not required as it used when reordering is enabled.

As NR is supporting reordering, to support in sequence delivery in LTE the PDCP status report will be prepared based on RX_DELIV. During the above state variable translation the SN is maintained while COUNT is not maintained.

In an embodiment, this method can also be used when PDCP SN size in NR PDCP is equal to PDCP SN size in LTE PDCP.

Alternate, mapping method for LTE to NR PDCP version change is provided when PDCP SN size in NR PDCP is greater than PDCP SN size in LTE PDCP.

Calculate the TX_NEXT based on Next_PDCP_TX_SN and TX_HFN in LTE PDCP. TX_NEXT=(2X*TX_HFN)+Next_PDCP_TX_SN, where X is equal to size (in bits) of PDCP SN in LTE PDCP.

Calculate the RX_NEXT based on Next_PDCP_RX_SN and HFN. RX_NEXT=(2X*RX_HFN)+Next_PDCP_RX_SN, where X is equal to size (in bits) of PDCP SN in LTE PDCP.

New value of RX_DELIV can be calculated based on Last_Submitted_PDCP_RX_SN and RX_HFN in LTE PDCP. RX_DELIV=(2X*RX_HFN)+Last_Submitted_PDCP_RX_SN, where X is equal to size (in bits) of PDCP SN in LTE PDCP.

Reordering_PDCP_RX_COUNT can be calculated based on first packet received from lower layers i.e based on RX_NEXT.

The PDCP SN of each PDCP SDU which is already associated with PDCP SN at the time of PDCP entity re-establishment is updated as follows:

New PDCP SN of PDCP SDU=Y LSBs of [COUNT value of this PDCP SDU in LTE PDCP]=Y LSBs of [(2X*HFN of this PDCP SDU in LTE PDCP)+PDCP SN of this PDCP SDU in LTE PDCP]. X is equal to size (in bits) of PDCP SN in LTE PDCP. Y is equal to size (in bits) of PDCP SN in NR PDCP. During the above state variable translation the COUNT is maintained while SN is not maintained.

In an embodiment, this method can also be used when PDCP SN size in NR PDCP is equal to PDCP SN size in LTE PDCP.

Alternate mapping method for NR to LTE PDCP version change is provided when PDCP SN size in LTE is greater than PDCP SN size in NR PDCP.

Calculate the Next_PDCP_TX_SN from TX_NEXT (based on target SN length). Next_PDCP_TX_SN=value of X LSBs of TX_NEXT where X is equal to size (in bits) of PDCP SN in LTE PDCP.

Calculate the TX_HFN from TX_NEXT (based on target SN length). TX_HFN=value of X1 MSBs of TX_NEXT where X1 is equal to size (in bits) of HFN in LTE PDCP.

Calculate the Next_PDCP_RX_SN from RX_NEXT (based on target SN length). Next_PDCP_RX_SN=value of X LSBs of RX_NEXT where X is equal to size (in bits) of PDCP SN in LTE PDCP.

Calculate the RX_HFN from RX_NEXT (based on target SN length). RX_HFN=value of X1 MSBs of RX_NEXT where X1 is equal to size (in bits) of HFN in LTE PDCP.

Calculate Last_Submitted_PDCP_RX_SN from RX_DELIV (based on target SN length). Last_Submitted_PDCP_RX_SN=value of X LSBs of RX_DELIV where X is equal to size (in bits) of PDCP SN in LTE PDCP.

Reordering_PDCP_RX_COUNT is not required as it used when reordering is enabled

As NR is supporting reordering, to support in sequence delivery in LTE the PDCP status report will be prepared based on RX_DELIV The PDCP SN of each PDCP SDU which is already associated with PDCP SN at the time of PDCP entity re-establishment is updated as follows:

New PDCP SN of PDCP SDU=X LSBs of [COUNT value of this PDCP SDU in NR PDCP]=X LSBs of [(2Y*HFN of this PDCP SDU in NR PDCP)+PDCP SN of this PDCP SDU in NR PDCP]. X is equal to size (in bits) of PDCP SN in LTE PDCP. Y is equal to size (in bits) of PDCP SN in NR PDCP. During the above state variable translation the COUNT is maintained while SN is not maintained.

In an embodiment, this method can also be used when PDCP SN size in NR PDCP is equal to PDCP SN size in LTE PDCP.

In an embodiment, the LTE PDCP to NR PDCP version change shall takes place through handover (HO) procedure. When PDCP version change for the DRB is triggered with HO procedure then one implication here is that RLC is re-established together with PDCP, which would make the interaction among RRC, LTE PDCP and NR PDCP a bit cumbersome. Following is the operation timeline for example:

1. t1: PDCP re-establishment is instructed by the RRC
   a. PDCP entity should differentiate whether it is normal PDCP re-establishment or PDCP re-establishment involving version change. Indication from RRC to PDCP is needed to indicate PDCP establishment with version change;
2. t2: Receiver RLC entity is re-established; LTE PDCP PDUs are forwarded to receiver PDCP entity;
3. t3: LTE PDCP PDUs shall be processed according to the LTE PDCP PDU format in the receiver PDCP entity; and
4. t4: NR PDCP state variable shall be set to the appropriate values, and PDCP re-establishment related operation follows. After the forwarded LTE PDCP PDUs are processed according to LTE operation and delivered to upper layer; RoHC is reset, new key are derived and new NR PDCP PDUs then sent after RLC re-establishment are processed with the NR PDCP format.

In the above mentioned operation the complexity is that some of PDCP re-establishment related operation is performed according to LTE PDCP header format as LTE PDCP PDUs received due to re-establishment of LTE RLC entity shall be processed according to LTE PDCP PDU format in LTE PDCP and others re-establishment procedure like setting of state variables, ROHC reset, applying new ciphering and integrity keys is performed according to NR PDCP re-establishment procedure.

Based on the indication that PDCP re-establishment involves PDCP version change from LTE to NR following detailed operation shall be performed by receiver PDCP entity:

1. The receiver PDCP entity separates the PDCP header and payload of the received PDCP PDUs upon RLC re-establishment;
2. The payload i.e. PDCP SDU is decrypted with current ciphering key and integrity check is performed with current integrity key according to LTE security algorithms;
3. The PDCP header is decompressed according to LTE operation and the header is processed according to LTE header format;
4. The processed PDCP SDUs are delivered to upper layer;
5. LTE PDCP entity indicate the NR PDCP entity to perform PDCP re-establishment procedure;
6. ROHC reset is performed if drb-ContinueROHC is not configured, new security keys are derived and hence receiver PDCP entity is re-established;
7. LTE State variables are translated into NR state variables according to one of the method based on continuing SN or continuing COUNT; and
8. New PDCP PDUs received from RLC entity are processed according to NR PDCP operation i.e. PDCP header processed according to NR PDCP header format, NR security algorithms applied for decryption and integrity check. Duplicate detection and reordering function will always be performed while processing PDCP SDUs.

Based on the indication that PDCP re-establishment involves PDCP version change from LTE to NR following detailed operation shall be performed by transmitter PDCP entity:

1. NR PDCP entity indicate the LTE PDCP entity to perform PDCP re-establishment procedure;
2. ROHC reset is performed if drb-ContinueROHC is not configured;
3. LTE State variables are translated into NR state variables according to one of the method based on continuing SN or continuing COUNT;
4. For PDCP SDUs to be re-transmitted, consider the PDCP SDUs as received from upper layer, the transmitter PDCP entity processed the PDCP header according to NR PDCP header format and performs compression of the header;
5. The transmitter PDCP entity processed the PDCP header according to NR PDCP header format and performs compression of the header;
6. The encryption and integrity protection is applied on the PDCP SDU based on new security keys and NR security algorithms; and
7. NR PDCP PDUs are delivered to lower layer for transmission. Transmitter entity can send the PDCP status report based on State variable and missing packet info.

Based on the indication that PDCP re-establishment involves PDCP version change from NR to LTE following detailed operation shall be performed by receiver PDCP entity:

1. The PDCP header is decompressed according to NR operation and the header is processed according to NR header format;
2. The processed PDCP SDUs are delivered to upper layer;
3. NR PDCP entity indicate the LTE PDCP entity to perform PDCP re-establishment procedure;
4. ROHC reset is performed if drb-ContinueROHC is not configured, new security keys are derived and hence receiver PDCP entity is re-established;
5. NR State variables are translated into LTE state variables according to one of the method based on continuing SN or continuing COUNT; and
6. New PDCP PDUs received from RLC entity are processed according to LTE PDCP operation i.e. PDCP header processed according to LTE PDCP header format, LTE security algorithms applied for decryption and integrity check. Duplicate detection and reordering function will always be performed while processing PDCP SDUs.

Based on the indication that PDCP re-establishment involves PDCP version change from NR to LTE following detailed operation shall be performed by transmitter PDCP entity:

1. NR PDCP entity indicate the LTE PDCP entity to perform PDCP re-establishment procedure;
2. ROHC reset is performed if drb-ContinueROHC is not configured;

3. NR State variables are translated into LTE state variables according to one of the method based on continuing SN or continuing COUNT;

4. For PDCP SDUs to be re-transmitted, consider the PDCP SDUs as received from upper layer, the transmitter PDCP entity processed the PDCP header according to LTE PDCP header format and performs compression of the header;

5. The transmitter PDCP entity processed the PDCP header according to LTE PDCP header format and performs compression of the header;

6. The encryption and integrity protection is applied on the PDCP SDU based on new security keys and NR security algorithms; and 7. LTE PDCP PDUs are delivered to lower layer for transmission. Transmitter entity can send the PDCP status report based on State variable and missing packet info.

When HO command message is received, the UE 100 identifies DRBs involving PDCP version change. There are two options to identify DRBs involving PDCP versions:

Option1: Explicit indication in RRC signaling-> in this method, the network indicates to the UE 100 that the DRBs involving PDCP version change explicitly. In the drbAddList for the drb-identity which is part of the current UE configuration and explicit indication is added like to NR-PDCP or to LTE-PDCP. Based on the explicit indication, the UE RRC generates the indication to PDCP for PDCP re-establishment involving PDCP version change.

Option2: Implicit indication based on the PDCP configuration in the RRC signaling-> In this method when for the DRB belonging to current UE configuration involving PDCP version change from LTE PDCP to NR PDCP, the network includes the RadioBearerConfiguration instead of the legacy pdcpConfig in the RRC signaling to the UE 100. For the other direction the network includes the legacy pdcpConfig instead of the RadioBearerConfiguration. Based on the received PDCP Configuration i.e. RadioBearerConfiguration or legacypdcpConfig the UE RRC generates the indication to PDCP for PDCP re-establishment involving PDCP version change.

Option3: Implicit indication based on the PDCP version change state variable-> In this method once UE 100 configure the MCG bearer based on type of PDCP configuration we can maintain the state variable say DRB version of the bearer. If the UE 100 receives the pdcp-Config while adding or modifying the MCG bearer then drb-version can be maintained as LTE PDCP. If the UE 100 receives the radioBearerConfig1 or radioBearerConfig2 while adding or modifying the MCG bearer then drb-version can be maintained as NR PDCP. Once the UE 100 receives the HO procedure, if the DRB belongs to current UE configuration involving PDCP version change from LTE PDCP to NR PDCP, the network includes the RadioBearerConfiguration instead of the legacy pdcpConfig in the RRC signaling to the UE 100. For the other direction the network includes the legacy pdcpConfig instead of the RadioBearerConfiguration. Based on the received PDCP Configuration i.e. RadioBearerConfiguration or legacypdcpConfig and stored drb-version the UE RRC generates the indication to PDCP for PDCP re-establishment involving PDCP version change.

If the explicit indication is not included for the drb-identity which is part of current UE configuration then it is PDCP re-establishment without involving PDCP version change i.e. normal PDCP re-establishment. The UE RRC does not generate the indication to PDCP and normal PDCP re-establishment is triggered.

In the implicit method, for the drb-identity which is part of the current UE configuration, if the RLC entity was associated with pdcpConfig and the HO message includes new pdcpConfig or delta signaling is applied then PDCP re-establishment does not involve PDCP version change (i.e. LTE PDCP is re-established as LTE PDCP). For the drb-identity which is part of the current UE configuration, if the RLC entity was associated with RadioBearerConfiguration and the HO message includes new RadioBearerConfiguration or delta signaling is applied then PDCP re-establishment does not involve PDCP version change (i.e. NR PDCP is re-established as NR PDCP). The UE RRC does not generate the indication to PDCP and normal PDCP re-establishment is triggered.

The UE 100 applies different set of operations to DRBs without involving PDCP version change (i.e. normal PDCP re-establishment) and for DRBs involving PDCP version change.

For DRBs identified by UE 100 without involving PDCP version change (for e.g., DRBs with LTE PDCP)-> apply normal PDCP re-establishment according to TS 36.323 as below:

1. Process the PDCP PDUs received from lower layer due to re-establishment based on the LTE PDCP format, and 2. Process the PDCP PDUs received from lower layer after HO based on the LTE PDCP format.

For DRBs identified by the UE 100 with PDCP version change from LTE PDCP to NR PDCP-> apply PDCP re-establishment from the LTE to NR as below:

1. Process the PDCP PDUs received from lower layer due to re-establishment based on the LTE PDCP format, 2. Set NR state variables to the appropriate values based on LTE state variables according to one of translation methods where either SN is continued or COUNT is continued, and 3. Process the PDCP PDUs received from lower layer after HO based on the NR PDCP format.

For DRBs identified by the UE 100 with PDCP version change from NR PDCP to LTE PDCP-> apply PDCP re-establishment from NR to LTE as below:

1. Process the PDCP PDUs received from lower layer due to re-establishment based on the NR PDCP format, 2. Set LTE state variables to the appropriate values based on NR state variables according to one of translation methods where either SN is continued or COUNT is continued, and 3. Process the PDCP PDUs received from lower layer after HO based on the LTE PDCP format.

For DRBs identified by the UE 100 without involving PDCP version change (for e.g., DRBs with NR PDCP)-> apply normal NR PDCP re-establishment as below:

1. Process the PDCP PDUs received from the lower layer due to re-establishment based on the NR PDCP format, and 2. Process the PDCP PDUs received from lower layer after HO based on the NR PDCP format.

Following are the procedures for PDCP entity re-establishment in NR:

When the upper layers request a PDCP entity re-establishment, the UE 100 shall additionally perform once the procedures described in this section. After performing the procedures in this section, the UE 100 shall follow the procedures in subclause 5.2 as defined in the standard. When upper layers request a PDCP entity re-establishment, the transmitting PDCP entity shall:

if the upper layer indicates it is PDCP re-establishment from the NR PDCP to the LTE PDCP perform the re-establishment procedure as specified in TS 36.323 else: (below procedure)

for UM DRBs and AM DRBs, reset the header compression protocol for uplink and start with an IR state in U-mode as defined in RFC 3095 and RFC 4815 if drb-ContinueROHC is not configured in TS 38.331;

for UM DRBs and SRBs, set TX_NEXT to the initial value;

for AM DRBs, if the PDCP entity is re-established from LTE PDCP

220—set TX_NEXT value based on NEXT_PDCP_TX_SN and TX_HFN;

for SRBs, discard all stored PDCP SDUs and PDCP PDUs;

apply the ciphering algorithm and key provided by upper layers during the PDCP entity re-establishment procedure;

apply the integrity protection algorithm and key provided by upper layers during the PDCP entity re-establishment procedure;

for UM DRBs, for each PDCP SDU already associated with a PDCP SN but for which a corresponding PDU has not previously been submitted to lower layers:

consider the PDCP SDUs as received from upper layer;

perform transmission of the PDCP SDUs in ascending order of the COUNT value associated to the PDCP SDU prior to the PDCP re-establishment without restarting the discardTimer.

if the PDCP entity is re-established from LTE PDCP for AM DRBs, for each PDCP SDU already associated with a PDCP SN but for which a corresponding PDCP Data PDU has not been confirmed by lower layers:

consider the PDCP SDUs as received from upper layer;

perform retransmission or transmission of the PDCP SDUs in ascending order of the COUNT value associated to the PDCP SDU prior to the PDCP re-establishment as specified below:

else: (below procedure)

for AM DRBs, from the first PDCP SDU for which the successful delivery of the corresponding PDCP Data PDU has not been confirmed by lower layers, perform retransmission or transmission of all the PDCP SDUs already associated with PDCP SNs in ascending order of the COUNT values associated to the PDCP SDU prior to the PDCP entity re-establishment as specified below:

perform header compression of the PDCP SDU as specified in the subclause 5.7.4 in the standard;

perform integrity protection and ciphering of the PDCP SDU using the COUNT value associated with this PDCP SDU as specified in the subclause 5.9 and 5.8 in the standard;

submit the resulting PDCP Data PDU to lower layer.

When upper layers request a PDCP entity re-establishment, the receiving PDCP entity shall:

for SRBs, discard all stored PDCP SDUs and PDCP PDUs for UM DRBs, if t-Reordering is running:

stop and reset t-Reordering;

deliver all stored PDCP SDUs to the upper layers in ascending order of associated COUNT values after performing header decompression;

if the upper layer indicates it is PDCP re-establishment from NR PDCP to LTE PDCP for AM DRB s, deliver all stored PDCP SDUs to the upper layers in ascending order of associated COUNT values after performing header decompression;

perform the re-establishment procedure as specified in TS 36.323 else:

for UM DRBs and AM DRBs, reset the header compression protocol for downlink and start with NC state in U-mode [8][9] if drb-ContinueROHC is not configured [3];

for UM DRBs and SRBs, set RX_NEXT and RX_DELIV to the initial value;

set RX_NEXT value based on NEXT_PDCP_RX_SN and RX_HFN;

set RX_DELIV value based on Last_Submitted_PDCP_RX_SN and RX_HFN;

apply the ciphering algorithm and key provided by upper layers during the PDCP entity re-establishment procedure;

apply the integrity protection algorithm and key provided by upper layers during the PDCP entity re-establishment procedure.

Annex (normative): Mapping between LTE and NR state variables during LTE to NR PDCP version change

| NR Parameters | Derivation of NR parameters from LTE parameters |
|---|---|
| TX_NEXT | $(2^{N1} * TX\_HFN) + Next\_PDCP\_TX\_SN$ where N1 is equal to size (in bits) of PDCP SN in LTE |
| RX_NEXT | $(2^{N1} * RX\_HFN) + Next\_PDCP\_RX\_SN$ where N1 is equal to size (in bits) of PDCP SN |
| RX_REORD | RX_NEXT |
| RX_DELIV | $(2^{N1} * RX\_HFN) + Last\_Submitted\_PDCP\_RX\_SN$ where N1 is equal to size (in bits) of PDCP SN |

Procedures for DRBs mapped on RLC AM in LTE, when upper layers request a PDCP re-establishment, the UE 100 shall:

if the upper layer indicates it is PDCP re-establishment from LTE PDCP to NR PDCP perform the re-establishment procedure as specified in TS 38.323 else:

reset the header compression protocol for uplink and start with an IR state in U-mode (if configured) [9][11], except if upper layers indicate stored UE AS context is used and drb-ContinueROHC is configured [3];

if connected as an RN, apply the integrity protection algorithm and key provided by upper layers (if configured) during the re-establishment procedure;

if upper layers indicate stored UE AS context is used, set Next_PDCP_TX_SN, and TX_HFN to 0;

if the PDCP entity is re-established from NR PDCP set NEXT_PDCP_TX_SN and TX_HFN value based on TX_NEXT;

apply the ciphering algorithm and key provided by upper layers during the re-establishment procedure;

for LWA bearers, consider all PDCP SDUs submitted to the LWAAP entity as successfully delivered;

if the PDCP entity is re-established from NR PDCP for AM DRBs, for each PDCP SDU already associated with a PDCP SN but for which a corresponding PDCP Data PDU has not been confirmed by lower layers:

consider the PDCP SDUs as received from upper layer;

perform retransmission or transmission of the PDCP SDUs in ascending order of the COUNT value associated to the PDCP SDU prior to the PDCP re-establishment:

else: (below procedure)
  from the first PDCP SDU for which the successful delivery of the corresponding PDCP PDU has not been confirmed by lower layers, perform retransmission or transmission of all the PDCP SDUs already associated with PDCP SNs in ascending order of the COUNT values associated to the PDCP SDU prior to the PDCP re-establishment as specified below:
  perform header compression of the PDCP SDU (if configured) as specified in the subclause 5.5.4 as defined in the standard;
  if connected as an RN, perform integrity protection (if configured) of the PDCP SDU using the COUNT value associated with this PDCP SDU as specified in the subclause 5.7 as defined in the standard;
  perform ciphering of the PDCP SDU using the COUNT value associated with this PDCP SDU as specified in the subclause 5.6 as defined in the standard;
  submit the resulting PDCP Data PDU to lower layer.
Procedures for DRBs mapped on RLC UM in LTE
When upper layers request a PDCP re-establishment, the UE 100 shall:
  if the upper layer indicates it is PDCP re-establishment from LTE PDCP to NR PDCP
  perform the re-establishment procedure as specified in TS 38.323
  else:
  reset the header compression protocol for uplink and start with an IR state in U-mode [9][11] if the DRB is configured with the header compression protocol and drb-ContinueROHC is not configured [3];
  set Next_PDCP_TX_SN, and TX_HFN to 0;
  apply the ciphering algorithm and key provided by upper layers during the re-establishment procedure;
  if connected as an RN, apply the integrity protection algorithm and key provided by upper layers (if configured) during the re-establishment procedure;
  for each PDCP SDU already associated with a PDCP SN but for which a corresponding PDU has not previously been submitted to lower layers:
  consider the PDCP SDUs as received from upper layer;
  perform transmission of the PDCP SDUs in ascending order of the COUNT value associated to the PDCP SDU prior to the PDCP re-establishment, as specified in the subclause 5.1.1 without restarting the discardTimer as defined in the standard.
Procedures for DRBs mapped on RLC AM in LTE while the reordering function is not used
When upper layers request a PDCP re-establishment while the reordering function is not used, the UE 100 shall:
  process the PDCP Data PDUs that are received from lower layers due to the re-establishment of the lower layers, as specified in the subclause 5.1.2.1.2 as defined in the standard;
  if the upper layer indicates it is PDCP re-establishment from LTE PDCP to NR PDCP
  perform the re-establishment procedure as specified in TS 38.323
  else:
  reset the header compression protocol for downlink and start with NC state in U-mode (if configured) [9][11], except if upper layers indicate stored UE AS context is used and drb-ContinueROHC is configured [3];
  if upper layers indicate stored UE AS context is used, set Next_PDCP_RX_SN, RX_HFN to 0 and Last_submitted_PDCP_RX_SN to Maximum_PDCP_SN;
  if the PDCP entity is re-established from NR PDCP
  set NEXT_PDCP_RX_SN and RX_HFN value based on RX_NEXT.
  apply the ciphering algorithm and key provided by upper layers during the re-establishment procedure.
  if connected as an RN, apply the integrity protection algorithm and key provided by upper layers (if configured) during the re-establishment procedure
Procedures for DRBs mapped on RLC UM in LTE
When upper layers request a PDCP re-establishment, the UE 100 shall:
  process the PDCP Data PDUs that are received from lower layers due to the re-establishment of the lower layers, as specified in the subclause 5.1.2.1.3 as defined in the standard;
  if the upper layer indicates it is PDCP re-establishment from LTE PDCP to NR PDCP
  perform the re-establishment procedure as specified in TS 38.323
  else:
  reset the header compression protocol for downlink and start with NC state in U-mode [9][11] if the DRB is configured with the header compression protocol and drb-ContinueROHC is not configured [3];
  set Next_PDCP_RX_SN, and RX_HFN to 0;
  apply the ciphering algorithm and key provided by upper layers during the re-establishment procedure.
  if connected as an RN, apply the integrity protection algorithm and key provided by upper layers (if configured) during the re-establishment procedure.
Annex (normative): Mapping between LTE and NR state variables during NR to LTE PDCP version change:

| LTE Parameters | Derivation of LTE parameters from NR parameters |
| --- | --- |
| Next_PDCP_TX_SN | value of N1 LSBs of TX_NEXT where N1 is equal to size (in bits) of PDCP SN |
| TX_HFN | value of N2 − N1 LSBs of TX_NEXT where N2 is equal to size (in bits) of COUNT |
| Next_PDCP_RX_SN | value of N1 LSBs of RX_NEXT where N1 is equal to size (in bits) of PDCP SN |
| RX_HFN | value of N2 − N1 LSBs of RX_NEXT where N2 is equal to size (in bits) of COUNT |
| Last_Submitted_PDCP_RX_SN | value of N1 LSBs of RX_DELIV where NT is equal to size (in bits) of PDCP SN |
| Reordering_PDCP_RX_COUNT | value of RX_REORD |

Reception of an RRCConnectionReconfiguration including the mobilityControlInfo by the UE (handover) in LTE:
If the RRCConnectionReconfiguration message includes the mobilityControlInfo and the UE 100 is able to comply with the configuration included in this message, the UE 100 shall:
  1> stop timer T310, if running;
  1> stop timer T312, if running;
  1> start timer T304 with the timer value set to t304, as included in the mobilityControlInfo;
  *3141> stop timer T370, if running;
  1> if the carrierFreq is included:
  2> consider the target PCell to be one on the frequency indicated by the carrierFreq with a physical cell identity indicated by the targetPhysCellId;

1> else:
    2> consider the target PCell to be one on the frequency of the source PCell with a physical cell identity indicated by the targetPhysCellId;
1> start synchronising to the DL of the target PCell;
NOTE 1: The UE 100 should perform the handover as soon as possible following the reception of the RRC message triggering the handover, which could be before confirming successful reception (HARQ and ARQ) of this message.
1> if BL UE or UE in CE:
*322 2> if same SFN-Indication is not present in mobilityControlInfo;
    3> acquire the MasterInformationBlock in the target PCell;
1> if makeBeforeBreak is configured:
    2> perform the remainder of this procedure including and following resetting MAC after the UE 100 has stopped the uplink transmission/downlink reception with the source cell(s);
NOTE 1a: It is up to UE 100 implementation when to stop the uplink transmission/downlink reception with the source cell(s) to initiate re-tuning for connection to the target cell [16], if makeBeforeBreak is configured.
1> reset MCG MAC and SCG MAC, if configured;
Method 1: Based on information received from the NW
    2> for each drb-Identity value included in the drb-ToAddModList that is part of the current UE configuration (DRB reconfiguration):
        3> if the DRB indicated by drb-Identity is an MCG DRB (reconfigure MCG):
            4> if the MCG RLC association was with pdcp config and radioBearerConfig1 is received:
                5> reconfigure the PDCP entity in accordance with the received radioBearerConfig1;
                5> Indicate the lower layers that it is PDCP re-establishment from LTE PDCP to NR PDCP
            4> if the MCG RLC association was with radioBearerConfig1 and pdcp config is received:
                5> reconfigure the PDCP entity in accordance with the received pdcp-config;
                5> Indicate the lower layers that it is PDCP re-establishment from NR PDCP to LTE PDCP
Method 2: Based on State Variable
    2> for each drb-Identity value included in the drb-ToAddModList that is part of the current UE configuration (DRB reconfiguration):
        3> if the DRB indicated by drb-Identity is an MCG DRB (reconfigure MCG):
            4> if the drb_version is set as NR pdcp and pdcp-Config is received:
                5> reconfigure the PDCP entity in accordance with the received pdcp-config;
                5> Indicate the lower layers that it is PDCP re-establishment from NR PDCP to LTE PDCP
            4> if the drb_version is set as LTE pdcp and radioBearerConfig1 is received:
                5> reconfigure the PDCP entity in accordance with the received radioBearerConfig1;
                5> Indicate the lower layers that it is PDCP re-establishment from LTE PDCP to NR PDCP:
1> re-establish PDCP for all RBs that are established;
NOTE 2: The handling of the radio bearers after the successful completion of the PDCP re-establishment, e.g. the re-transmission of unacknowledged PDCP SDUs (as well as the associated status reporting), the handling of the SN and the HFN, is specified in TS 36.323 [8].
1> re-establish MCG RLC and SCG RLC, if configured, for all RBs that are established;
DRB addition/modification in LTE
The UE 100 shall:
1> for each drb-Identity value included in the drb-ToAddModList that is not part of the current UE configuration (DRB establishment including the case when full configuration option is used):
    2> if the concerned entry of drb-ToAddModList includes the drb-TypeLWA set to TRUE (i.e. add LWA DRB):
        3> perform the LWA specific DRB addition or reconfiguration as specified in 5.3.10.3a2;
    2> if the concerned entry of drb-ToAddModList includes the drb-TypeLWIP (i.e. add LWIP DRB):
        3> perform LWIP specific DRB addition or reconfiguration as specified in 5.3.10.3a3;
    2> else if drb-ToAddModListSCG is not received or does not include the drb-Identity value (i.e. add MCG DRB or split DRB for EN-DC):
        3> if pdcp-Config is received, establish a PDCP entity and configure it with the current MCG security configuration and in accordance with the received pdcp-Config;
            4> set the drb_version as LTE PDCP
*359 3> establish an MCG RLC entity or entities in accordance with the received rlc-Config;
        3> establish an MCG DTCH logical channel in accordance with the received logicalChannelIdentity and the received logicalChannelConfig;
        3> if pdcp-Config is not received, associate MCG RLC and MCG DTCH entities with the PDCP entity received in radioBearerConfig1 or radioBearerConfig2
            4> set the drb_version as NR PDCP The UE 100 can be configured to operate in dual connectivity (DC) mode of operation wherein the UE 100 maintains RRC connection with a serving cell from the master node (MN) and the UE 100 can be configured with one or more serving cells from the secondary node (SN) for addition data throughput. The data radio bearer (DRB) established on the serving cell of MN has the PDCP anchor point terminated at the MN and such DRB is referred as MCG DRB. The data radio bearer (DRB) established on the serving cell of SN has the PDCP anchor point terminated at the SN and such DRB is referred as SCG DRB. The UE 100 can be configured with a split DRB wherein the PDCP PDUs can be transmitted through the two RLC entities established in the MN and SN for that DRB. The PDCP anchor point of such split DRB can be configured to be terminated either at the MN or SN and it is decided by the MN. If the PDCP termination point of the split DRB is MN then the DRB is referred as MCG Split DRB. If the PDCP termination point of the split DRB is SN then the DRB is referred as SCG Split DRB. For the LTE and NR interworking based on DC i.e. EN-DC mode of operation where the MN is LTE eNB 200 and SN is NR gNB, the MCG DRB can be configured with either LTE PDCP or NR PDCP whereas the split DRB (regardless of the PDCP termination point) and SCG DRB is configured for NR PDCP.

If EN-DC capable UE 100 connected to legacy LTE node (i.e. standalone mode) is undergoing handover towards EN-DC capable LTE node then it desirable that during the handover procedure the PDCP version of the DRBs of the UE 100 is changed to NR PDCP. This would avoid another handover procedure for the EN-DC capable UE 100 if the DRB is configured with NR PDCP, otherwise just for version change there will be another handover procedure i.e. MCG bearer with LTE PDCP to MCG bearer with NR PDCP.

If the MCG DRB is configured with LTE PDCP then for performing bearer type reconfiguration to SCG or Split DRB, the PDCP version is changed from LTE PDCP to NR PDCP for the MCG DRB through the handover procedure which involves PDCP re-establishment. During UE mobility from legacy LTE to Rel-15 LTE node connected to EPC, for EN-DC capable UE 100 the PDCP version change of MCG DRB from LTE PDCP to NR PDCP can be supported through handover procedure.

From UE 100 perspective there are only three bearer types i.e. MCG DRB, SCG DRB and Split DRB. The split DRB can either terminate at MN or terminate at SN based on MN decision. In EN-DC, network can configure the split bearer with the following configuration:

Split bearer: NR PDCP container+LTE configurations on RLC, MAC and physical layers+NR configuration container on NR RLC, MAC and physical layers, etc.

Split bearer whose PDCP termination point is at MN can be termed as split bearer terminated at MN. Split bearer whose PDCP termination point is at SN can be termed as the split bearer terminated at SN. There are three options for security keys handling in EN-DC (also applicable for NGEN-DC and NE-DC)

a. Security key per PDCP termination point i.e. 2 security keys, b. Separate security key for MCG, Split and SCG bearer i.e. 3 security keys, c. Security key per DRB.

In option a, UE 100 uses two set of keys i.e. one for all MCG DRBs and MCG-anchored split DRBs and another one for all SCG DRBs and SCG-anchored split DRBs. This is similar to Rel-12 LTE DC. In case of separate security key per network termination point, UE 100 based on security keys can make it out whether the split bearer terminates at MN or terminates at SN. In this case UE 100 will be aware of location of PDCP anchor point i.e. whether split bearer is terminated at MN or SN.

When the 2 security key solution is applied, there is no need to do MAC reset for the MCG DRB to/from MCG split DRB and SCG DRB to/from SCG Split DRB type change. This is because the PDCP termination point will not change in these bearer type transitions and hence the security key will also not change. The security key will change for the MCG to/from SCG and MCG to/from SCG Split bearer type change or when there is handover for the PCell in MCG or when there is SN change. However this is also applicable (i.e. change in security keys) for option b and option c for all the bearer type changes.

For option a, UE based on the indicated security key for the split bearer can make out termination point of split bearer. For option a, MAC reset is not needed during MCG to/from MCG split and SCG to/from SCG Split bearer type change. For option b, UE 100 uses different key per bearer type i.e. three separate keys for MCG, SCG and Split bearers. As in this case split bearer terminates at MN or SN can use separate keys from MCG and SCG bearers, so in this option split bearer termination point is transparent to UE. The split bearer termination point is transparent to UE 100 for the option when security key is per DRB i.e. option c. With security key per bearer type (option b) or Security key per DRB (option c) for the configured split bearer the UE 100 cannot make out termination point of split bearer. In LTE-NR interworking, bearer type change can be supported for MCG to/from MCG split and SCG to/from SCG Split with RRC reconfiguration without mobilitycontrolinformation i.e., no handover procedure. The option b and option c brings additional complexity to handle these bearer type changes as follows:

i. during these bearer type changes keys will always have to be changed;

ii. the key change for these bearer type changes occurs even when the PDCP termination point has not changed (according to security principle key should be changed when PDCP termination point changes); and iii. if keys are changed then MAC reset is needed which can cause the impact on the other bearers also.

When option b and option c is applied then to avoid MAC reset special handling is needed to ensure that the data on other bearer is not impacted. Such special handling bring additional complexity which can be completely avoided if (option a) is applied. Option b and Option c requires MAC reset during MCG to/from MCG split and SCG to/from SCG Split bearer type change even when PDCP termination point is not changed. To avoid MAC reset special handling is required which brings additional complexity. Making the PDCP termination point for split bearer is transparent to the UE 100 when the option b and option c is applied does not really bring benefits for the UE 100 in terms of bearer type change handling or reducing complexity. Option a offers the same level of security protection as the option b and c. In EN-DC, NGEN-DC and NE-DC Security key per PDCP termination point i.e. 2 security keys can be supported.

Figure 9:
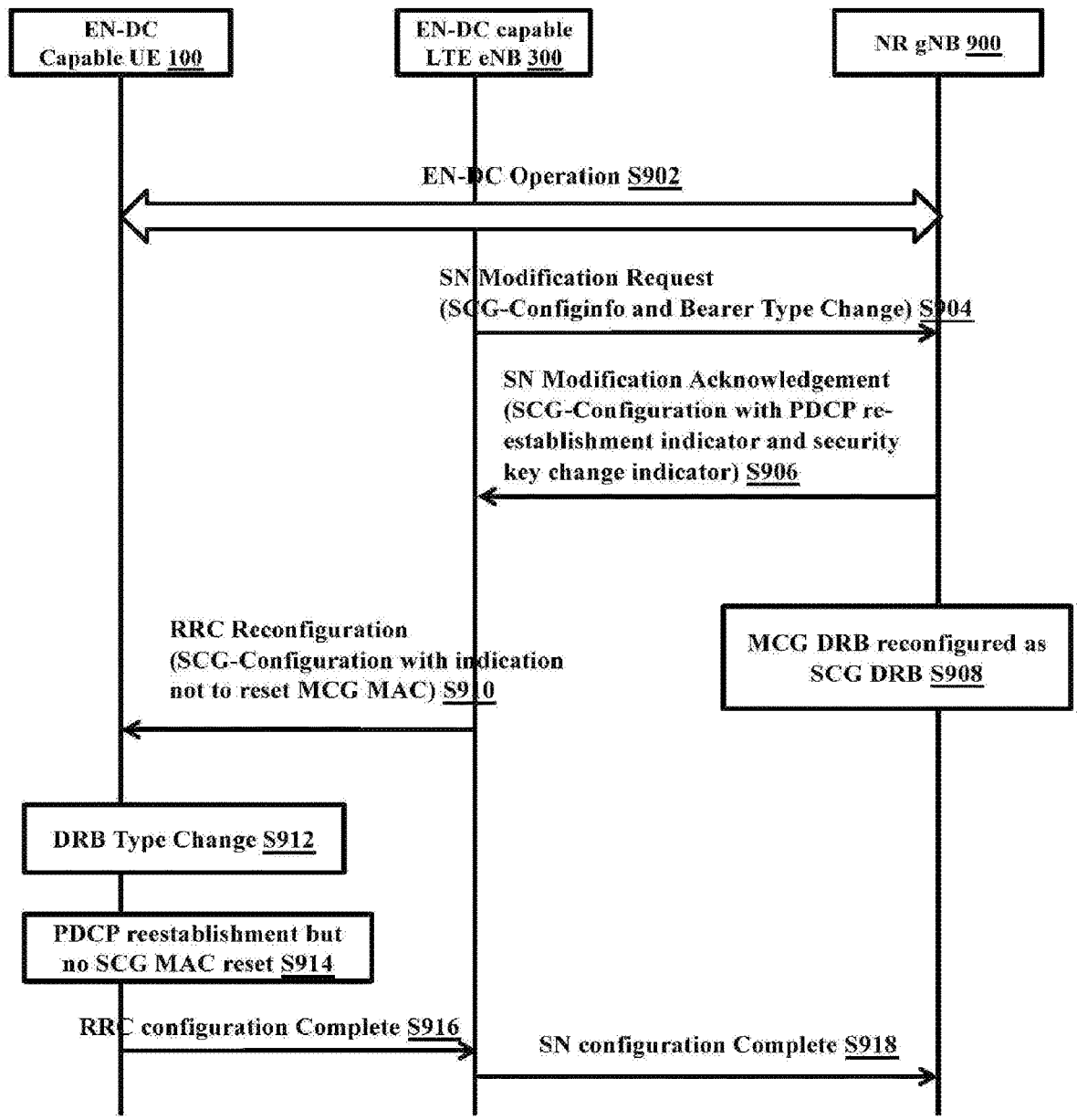
FIG. 9 illustrates SN modification procedure—MN initiated, according to an embodiment as disclosed herein.

The bearer type change from MCG DRB (NR PDCP configured) to SCG DRB involves the PDCP anchor point in the network for the PDCP entity associated with the MCG DRB to be changed from the MN to the SN as shown in FIG. 9. Since the security key used in the SN is different from the security key used in the MN, the change of the PDCP anchor point involves transmitting the signaling message i.e. RRC reconfiguration including the mobility control information to the UE i.e. SCG-Config. The mobility control information i.e. SCG-Config includes one of the PDCP re-establish indication and the security key change indication in response to the change of the anchor point in the network for the PDCP entity associated with MCG DRB. The signaling message can be a RRC reconfiguration with SCG-Config or bearer type change message indicating that MCG MAC reset is not needed. The signaling message is triggered for bearer type change from MCG DRB to SCG DRB, wherein the MCG PDCP entity if configured as NR PDCP entity. EN-DC operation should support the one step (direct) bearer type change between MCG DRB to/from split DRB and MCG DRB to/from SCG DRB, when the MCG DRB is configured with NR PDCP.

FIG. 9 illustrates SN modification procedure—MN initiated, according to an embodiment as disclosed herein. At S902, the EN-DC operation is performed between the EN-DC capable UE 100 and the NR gNB 900. At S904, the EN-DC capable LTE eNB 300 sends the SN modification request including the SCG-Configinfo and bearer type change to the NR gNB 900. At S906, the NR gNB 900 sends the SN modification acknowledgement message including SCG-Configuration with PDCP re-establishment indicator and security key change indicator to the EN-DC capable LTE eNB 300.

The NR gNB 900 performs that MCG DRB is reconfigured as SCG DRB at S908. The EN-DC capable LTE eNB 300 sends the RRC reconfiguration including the SCG-configuration with indication not to reset MCG MAC to the EN-DC capable UE 100 at S910. The EN-DC capable UE 100 performs the DRB type change at S912. The EN-DC capable UE 100 performs PDCP reestablishment but no SCG MAC reset at S914. The EN-DC capable UE 100 sends the RRC configuration Complete to the EN-DC capable LTE eNB 300 at S916. The EN-DC capable LTE eNB 300 sends the SN configuration complete to the NR gNB 900 at S918.

Specifically, as shown in FIG. 9, the MN i.e., LTE eNB 200 sends the SN Modification Request message which includes the SCG-ConfigInfo basically indicating the bearer type change from MCG DRB to SCG DRB. The MN sends the SN Modification Request message, which may contain bearer context related or other UE context related information, data forwarding address information (if applicable) and SCG-ConfigInfo which contains the MCG configuration, key change indication and the entire UE capabilities for UE capability coordination to be used as basis for the reconfiguration by the SN. The SN i.e. NR gNB 900 responds with the SN Modification Request Acknowledge message, which may contain radio configuration information within SCG-Config message and data forwarding address information (if applicable). In this step, the SN initiates the PDCP re-establishment indicator and the key change indicator i.e. the SCG-Config message indicates one of the PDCP re-establish indication and the security key change indication. The MN shall continue sending DL PDCP PDUs to the SN with the previous DL GTP TEID until it performs PDCP re-establishment or PDCP data recovery, and use the new DL GTP TEID starting with the PDCP re-establishment or data recovery.

Figure 10:
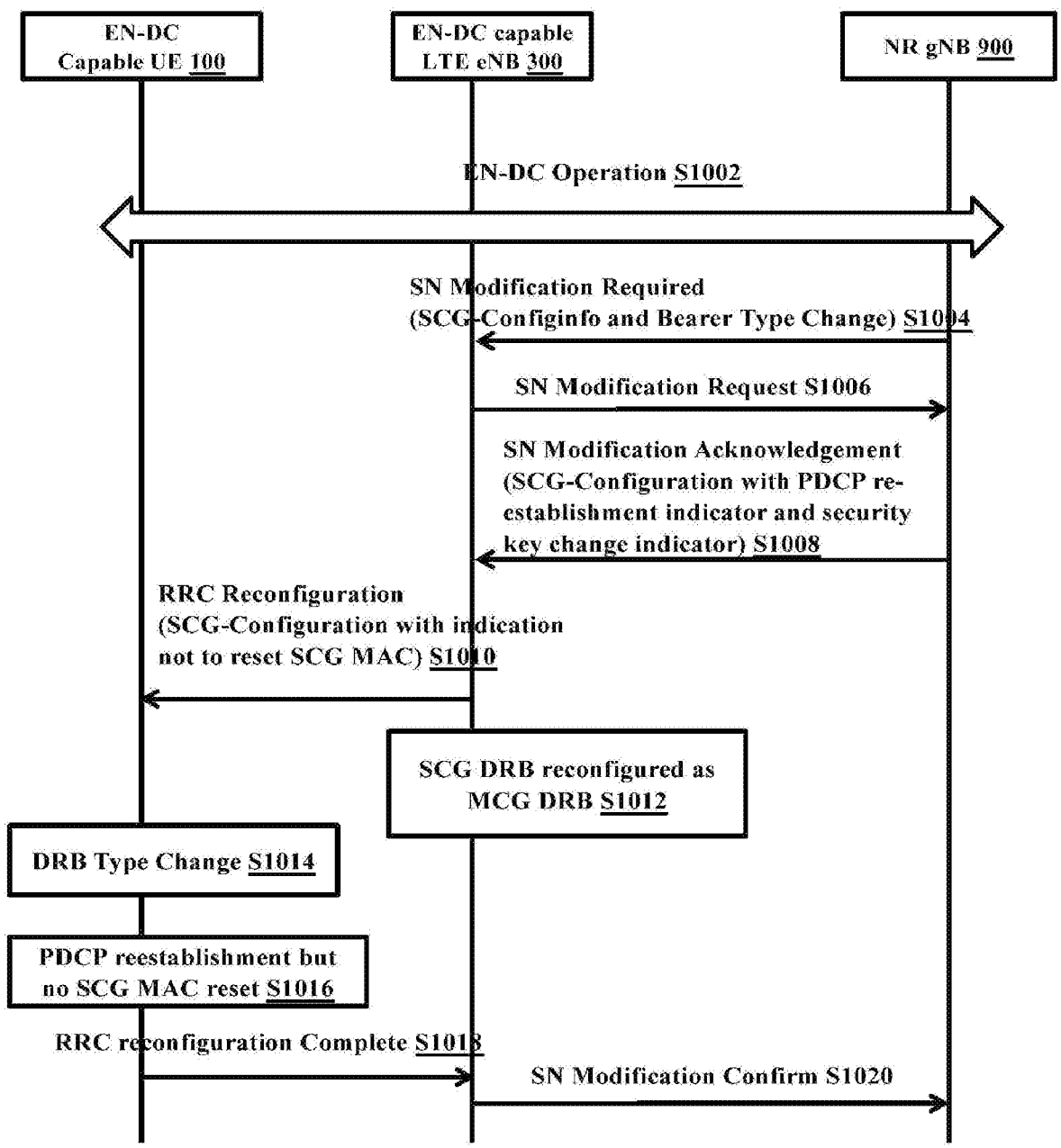
FIG. 10 illustrates SN modification procedure—SN initiated, according to an embodiment as disclosed herein.

The bearer type change from SCG DRB to MCG DRB (NR PDCP configured) involves the PDCP anchor point in the network for the PDCP entity associated with the SCG DRB to be changed from the SN to the MN as shown in FIG. 10 Since the security key used in the MN is different from the security key used in the SN, the change of the PDCP anchor point involves transmitting the signaling message i.e. RRC reconfiguration including the mobility control information to the UE i.e. SCG-Config. The mobility control information i.e. SCG-Config includes one of the PDCP re-establish indication and the security key change indication in response to the change of the anchor point in the network for the PDCP entity associated with SCG DRB. The signaling message can be a RRC reconfiguration with SCG-Config or bearer type change message indicating that SCG MAC reset is not needed. The signaling message is triggered for bearer type change from SCG DRB to MCG DRB, wherein after reconfiguration the MCG PDCP entity is configured as NR PDCP entity. EN-DC operation should support the one step (direct) bearer type change between SCG DRB to MCG DRB, when the MCG DRB is configured with NR PDCP.

FIG. 10 illustrates SN modification procedure—SN initiated, according to an embodiment as disclosed herein. At S1002, the EN-DC operation is performed between the EN-DC capable UE 100 and the NR gNB 900. At 1004, the NR gNB 900 sends the SN modification required message including SCG-Configinfo and Bearer Type Change to the EN-DC capable LTE eNB 300

At S1006, the EN-DC capable LTE eNB 300 sends the SN modification request including the SCG-Configinfo and bearer type change to the NR gNB 900. At S1008, the NR gNB 900 sends the SN modification acknowledgement message including SCG-Configuration with PDCP re-establishment indicator and security key change indicator to the EN-DC capable LTE eNB 300. The EN-DC capable LTE eNB 300 sends the RRC reconfiguration including SCG-Configuration with indication not to reset SCG MAC to the UE 100 at S1010.

The EN-DC capable LTE eNB 300 performs that SCG DRB is reconfigured as MCG DRB at S1012. The EN-DC capable UE 100 performs the DRB type change at S1014. The EN-DC capable UE 100 performs PDCP reestablishment but no SCG MAC reset at S1016. The EN-DC capable UE 100 sends the RRC configuration Complete to the EN-DC capable LTE eNB 300 at S1018. The EN-DC capable LTE eNB 300 sends the SN modification configuration message to the NR gNB 900 at S1020.

Specifically, as shown in FIG. 10, the SN i.e. NR gNB sends the SN Modification Required message which may contain bearer context related, other UE context related information and SCG-Config which contains the new radio resource configuration of SCG. For bearer release or modification a corresponding E-RAB list is included in the SN Modification Required message i.e. bearer type change from SCG DRB to MCG DRB. In case of release of bearer served by SN, SCG-Config is not included. If data forwarding and/or security key change needs to be applied, the MN triggers the preparation of the MN initiated SN Modification procedure. The MN i.e. LTE eNB 200 sends the SN Modification Request message which includes forwarding address and/or security key information. If the SN requested to release a SCG bearer, and the MN decides to reconfigure it to an MCG bearer, the MN provides the Key Change Indication within the SN Modification Request message and the SN provides respective RRC information in the SCG-Configuration within the SN Modification Request Acknowledgement message.

If MN accepts the SN request, the MN sends the RRC Connection Reconfiguration message to the UE including the new radio resource configuration of SCG according to the SCG-Config i.e. indicates one of the PDCP re-establish indication, the security key change indication and not to reset the SCG MAC. The UE applies the new configuration and replies the RRC Connection Reconfiguration Complete message. Upon successful completion of the reconfiguration, the success of the procedure related to SCG-Config is indicated in the SN Modification Confirm message.

The bearer type change from MCG DRB (NR PDCP configured) to/from MCG Split DRB and SCG DRB to/from SCG Split DRB does not involve the PDCP anchor point change in the network. Since the security key is same during these bearer type changes the PDCP is not re-established during these bearer type changes but PDCP recovery procedure may be triggered for the bearer type change from split DRB to MCG/SCG DRB. The security key is not changed since there is no change of the PDCP anchor point it involves transmitting the signaling message including the control information to the UE 100. The control information does not includes one of the PDCP re-establish indication and the security key change indication in response to the bearer type change in the network for the PDCP entity associated with MCG DRB when reconfigured as MCG split DRB and vice-versa. Same is case for SCG DRB reconfiguration to SCG Split DRB and vice-versa.

The bearer type change from MCG DRB (NR PDCP configured) to SCG Split DRB involves the PDCP anchor point in the network for the PDCP entity associated with the MCG DRB to be changed from the MN to the SN. This can be achieved either with a direct change or a two-step change wherein the MCG DRB is first changed to SCG DRB and subsequently the SCG DRB is reconfigured as SCG Split DRB. Regardless of direct change or two-step change, since the security key used in the SN is different from the security key used in the MN, the change of the PDCP anchor point involves transmitting the signaling message including the control information to the UE 100. The control information includes one of the PDCP re-establish indication and the security key change indication in response to the change of the anchor point in the network for the PDCP entity associated with MCG DRB.

Handling of SCGDRB during S-KgNB (i.e. security key used in SN) is changed due to key refresh or SN change will result in SCG PDCP, SCG RLC re-establishment and SCG MAC reset. Split DRB will have one PDCP entity which will be either MCG PDCP entity or SCG PDCP entity based on termination point of split bearer. Apart from this it will also have MCG RLC/MAC entity and SCG RLC/MAC entity.

For SCG split DRB as PDCP termination point is at SN so UE 100 will be configured with SCG PDCP entity. When S-KgNB is changed due to key refresh or SN change then the SCG PDCP/RLC need to be re-established and SCG MAC needs to be reset. Apart from this MCG RLC entity associated with this split bearer need to be re-established and MCG MAC need to be reset to discard the data with old keys.

For MCG split DRB as PDCP termination point is at MN so that the UE 100 will be configured with MCG PDCP entity. When SN is changed and the UE 100 is configured with MCG split DRB then there will be no impact on MCG PDCP/RLC/MAC entity but corresponding SCG RLC/MAC entity will be impacted and need to be re-establish and reset. In this case only reset/re-establish the SCG RLC and MAC entity associated with MCG split DRB but do not re-establish the MCG PDCP entity so there is no way for recovery of lost data which happen due to SCG RLC re-establishment procedure. There is need to introduce the PDCP data recovery procedure for the MCG split DRB during SN change procedure.

Centralized deployment consist of CU, DU, and TRPs (Transmission Reception Point) nodes. One of possible type of mobility procedure due to this split architecture is intra CU-inter DU handover. In this case there will be no change in CU entity but handover can occur between two DU entities serving same CU node. During Intra CU-inter DU HO, there is no need of PDCP re-establishment as PDCP termination point does not change but it is required to perform re-establishment and Reset for RLC and MAC entity as RLC and MAC entity at NW side changes. During inter CU handover, as PDCP termination point changes then all L2 entities need to be re-established and reset. In EN-DC, for SCG DRB and split DRB, when SN does not change during handover then SCG RLC is re-established and SCG MAC is reset.

In EN-DC, if bearer type change occurs through handover or SN change, then UE needs to follow the same rule as applicable during handover or SN change for bearer type change as it may involves key change or PDCP anchor point change or PDCP version change. SN change is a synchronous SCG reconfiguration procedure including reset/re-establishment of layer 2 and, if SCG DRBs are configured, refresh of security. If Bearer type change happens through handover procedure then MCG bearer, split bearer and SCG bearer, MCG/SCG PDCP/RLC should be re-established and MCG/SCG MAC should be reset. If bearer type change happens through SN change procedure then SCG PDCP re-established, SCG RLC re-established and SCG MAC is reset. Bearer type change through handover or SN change may cause data interruption in service. There are few bearer type change which does not involve change in PDCP termination point or keys. Those bearer type changes can be supported without mobility procedure i.e. handover or SN change procedure. Consider the case if the UE 100 is supporting Security key per PDCP termination point i.e. 2 security key then bearer type change between MCG and MCG split bearer does not involve any key or PDCP termination point change. In this case there is no need of any synchronous reconfiguration procedure as PDCP termination point does not change. This type of bearer change can be supported without mobility procedure (i.e. no handover) as result there will be no impact of data on other bearers. So no interruption in user plane and latency can be reduced. In case there is no change in MN/SN then bearer type change should be possible without mobility procedure. Bearer type change without mobility procedure should only be possible when keys, PDCP version and PDCP termination point does not change. The same is true for bearer type change between SCG DRB and SCG split DRB.

MCG DRB to/from SCG DRB type change option involves change in keys and PDCP termination point. During MCG to SCG bearer type change when MCG RLC entity is reconfigure to SCG RLC entity then corresponding mapping between MCG RLC entity and MCG MAC will be released and new mapping will be created between SCG RLC entity and SCG MAC entity. The same is applicable during SCG to MCG bearer type change. In this case although MCG and SCG MAC entity will have data with old keys but there is no need to reset MCG MAC and SCG MAC, as corresponding logical channel mapping will be released due to release or reconfiguration of the RLC entity. As a result old data will automatically get discarded by the MAC. Similarly during MCG split bearer to MCG or SCG split bearer to SCG bearer type change the corresponding logical channel will be released so there is no need to do MAC reset.

When bearer type change occurs between MCG DRB to/from SCG split DRB then it involves key change as well as PDCP termination point change. As a result of this, the MCG MAC will have data with old set of keys as corresponding mapping between RLC entity and MAC entity will not be released. Due to this it is required to reset the MCG MAC entity. Bearer type change between MCG split DRB and MCG DRB or SCG split DRB and SCG DRB can be supported without re-establishing the PDCP and RLC entity and without resetting the MAC entity. This is valid for the case when there is no change in keys or PDCP termination point or PDCP version change. NW can support such bearer type change without handover or SN change procedure. There is no need to re-establish and reset the L2 entities when bearer type change occurs without mobility procedure. EN-DC operation should support the one step (direct) bearer type change between MCG DRB to/from MCG split DRB without using the handover procedure. EN-DC operation should support the one step (direct) bearer type change between SCG DRB to/from SCG split DRB without using the handover procedure or SN change procedure.

Bearer type change between MCG and SCG involves key change and PDCP termination point change so there is need of PDCP kind of re-establishment procedure for bearer change between MCG and SCG. There is no need of reset of MAC entity for MCG to/from SCG bearer type change. MCG to/from SCG bearer type change can also cause change in version of RLC i.e. LTE RLC to/from NR RLC. During MCG to SCG bearer type change, the UE 100 need to do RLC re-establishment procedure as it may have buffered data due to re-ordering functionality in LTE RLC. The UE 100 can do RLC re-establishment for MCG entity and then reconfigure the MCG RLC entity to SCG RLC entity. During SCG to MCG bearer type change as NR RLC does not support reordering functionality so there is no need to do RLC re-establishment. The UE 100 can simply release SCG RLC entity and established the MCG RLC entity. EN-DC operation should support the one step (direct) bearer type change between MCG to/from SCG bearer with the PDCP re-establishment kind procedure without using the handover procedure or SN change procedure. For SCG to MCG bearer type change, RLC re-establishment is not required and bearer type change can be supported by releasing the SCG RLC entity and establishing the MCG RLC entity. Bearer type change between MCG and SCG split DRB involves key change and PDCP termination point change so there is need of PDCP kind of re-establishment procedure. MAC reset is required for bearer type change between MCG to/from SCG split DRB.

Figure 11:
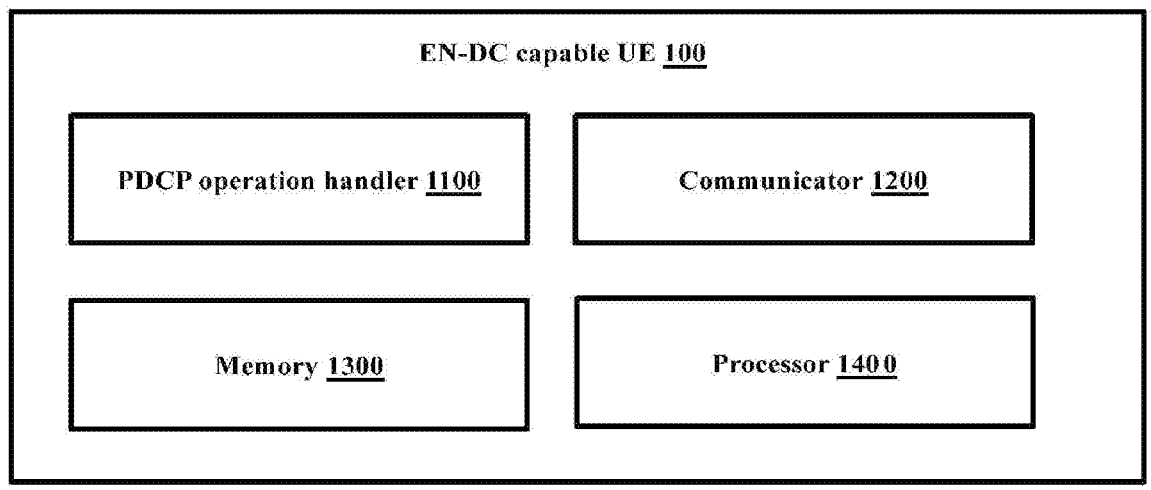
FIG. 11 is block diagram of the EN-DC capable UE, according to the embodiment as disclosed herein.

FIG. 11 is block diagram of the EN-DC capable UE 100, according to the embodiment as disclosed herein. In an embodiment, the EN-DC capable UE 100 includes a PDCP operation handler 1100, a communicator 1200, a memory 1300 and a processor 1400. The processor 1400 is operated with the PDCP operation handler 1100, the communicator 1200, and the memory 1300.

In an embodiment, the PDCP operation handler 1100 is configured to receive the handover message from the LTE node (i.e., LTE eNB 200). The handover message includes the indication indicating the PDCP version change from the LTE PDCP to the NR PDCP. Further, the PDCP operation handler 1100 is configured to indicate the indication from the RRC entity of the UE 100 to the E-UTRA PDCP entity of the UE 100. Further, the PDCP operation handler 1100 is configured to receive the LTE PDCP PDUs from the LTE RLC entity by the receiver E-UTRA PDCP entity upon re-establishing LTE RLC entity based on the indication.

Further, the PDCP operation handler 1100 is configured to process the LTE PDCP PDUs at the receiver E-UTRA PDCP entity using the LTE format. Further, the PDCP operation handler 1100 is configured to reestablish the receiver E-UTRA PDCP entity of the UE 100 and the transmitter E-UTRA PDCP entity of the UE 100. Further, the PDCP operation handler 1100 is configured to re-transmit the PDCP SDUs by the transmitter NR PDCP entity using the NR format. Further, the PDCP operation handler 1100 is configured to process PDCP PDUs received by the receiver NR PDCP entity and PDCP SDUs received by the transmitter NR PDCP entity based on the NR PDCP operation.

In an embodiment, the PDCP operation handler 1100 is configured to receive the handover message from the NR node (i.e., EN-DC capable LTE eNB 300). The handover message includes the indication indicating the PDCP version change from the NR PDCP to the LTE PDCP. Further, the PDCP operation handler 1100 is configured to indicate the indication from the RRC entity of the UE 100 to the NR PDCP entity of the UE 100. Further, the PDCP operation handler 1100 is configured to receive NR PDCP PDUs from the LTE RLC entity by the receiver NR PDCP entity upon re-establishing LTE RLC entity based on the indication.

Further, the PDCP operation handler 1100 is configured to process the NR PDCP PDUs at the receiver NR PDCP entity using the NR format. Further, the PDCP operation handler 1100 is configured to reestablish the receiver NR PDCP entity of the UE 100 and the transmitter NR PDCP entity of the UE 100. Further, the PDCP operation handler 1100 is configured to re-transmit the PDCP SDUs by the transmitter LTE PDCP entity using the LTE format. Further, the PDCP operation handler 1100 is configured to process another PDCP PDUs received by the receiver LTE PDCP entity and another PDCP SDUs received by the transmitter LTE PDCP entity based on the LTE PDCP operation.

The processor 1400 is configured to execute instructions stored in the memory 1300 and to perform various processes. The communicator 1200 is configured for communicating internally between internal hardware components and with external devices via one or more networks.

The memory 1300 stores the effect and condition. The memory 1300 also stores instructions to be executed by the processor 1400. The memory 1300 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 1300 may, in some examples, be considered a non-transitory storage medium. The term "non-transitory" may indicate that the storage medium is not embodied in a carrier wave or a propagated signal. However, the term "non-transitory" should not be interpreted that the memory 1300 is non-movable. In some examples, the memory 1300 can be configured to store larger amounts of information than the memory. In certain examples, a non-transitory storage medium may store data that can, over time, change (e.g., in Random Access Memory (RAM) or cache).

Although the FIG. 11 shows various hardware components of the EN-DC capable UE 100 but it is to be understood that other embodiments are not limited thereon. In other embodiments, the EN-DC capable UE 100 may include less or more number of components. Further, the labels or names of the components are used only for illustrative purpose and does not limit the scope of the invention. One or more components can be combined together to perform same or substantially similar function to handle the PDCP operation in the wireless communication system.

Figure 12:
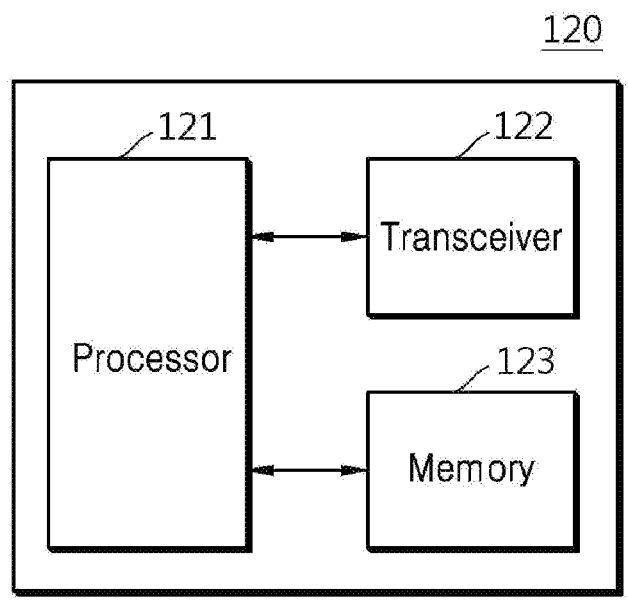
FIG. 12 is a block diagram illustrating the structure of a base station according to another embodiment of the present disclosure.

FIG. 12 is a block diagram illustrating the structure of a device for a base station according to another embodiment of the present disclosure.

Referring to the FIG. 12, the device for the base station 120 may include a processor 121, a transceiver 122 and a memory 123. However, all of the illustrated components are not essential. The base station 120 may be implemented by more or less components than those illustrated in FIG. 12. In addition, the processor 121 and the transceiver 122 and the memory 123 may be implemented as a single chip according to another embodiment.

The aforementioned components will now be described in detail.

The processor 121 may include one or more processors or other processing devices that control the proposed function, process, and/or method. Operation of the base station 120 may be implemented by the processor 121.

The processor 121 may determine the locations of transmission resources and reception resources.

The transceiver 122 may include a RF transmitter for up-converting and amplifying a transmitted signal, and a RF receiver for down-converting a frequency of a received signal. However, according to another embodiment, the transceiver 122 may be implemented by more or less components than those illustrated in components.

The transceiver 122 may be connected to the processor 121 and transmit and/or receive a signal. The signal may include control information and data. In addition, the transceiver 122 may receive the signal through a wireless channel and output the signal to the processor 121. The transceiver 122 may transmit a signal output from the processor 121 through the wireless channel.

The memory 123 may store the control information or the data included in a signal obtained by the base station 120.

The memory 123 may be connected to the processor 121 and store at least one instruction or a protocol or a parameter for the proposed function, process, and/or method. The memory 123 may include read-only memory (ROM) and/or random access memory (RAM) and/or hard disk and/or CD-ROM and/or DVD and/or other storage devices.

The various actions, acts, blocks, steps, or the like in the flow diagrams 600 and 800 may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method, performed by a dual connectivity capable user equipment (UE), of handling a packet data convergence protocol (PDCP) operation in a wireless communication system, the method comprising:
 receiving a handover message from a first network, wherein the handover message comprises an indicator indicating a packet data convergence protocol (PDCP) version change for a first PDCP layer of the first network;
 transmitting the indicator to the first PDCP layer of the UE, wherein the UE is in a connected state with the first network comprising the first PDCP layer and an RLC layer that are established with the UE;
 performing re-establishment of the RLC layer based on the indicator;
 receiving first PDCP protocol data units (PDUs) from the RLC layer in response to performing the re-establishment of the RLC layer;
 processing, based on a first format, the first PDCP PDUs at the first PDCP layer;
 performing re-establishment of the first PDCP layer associated with the first network;
 transmitting, based on a second format, PDCP service data units (SDUs) to a second network in accordance with a second PDCP layer that is determined by the re-establishment of the first PDCP layer associated with the first network; and
 processing, the PDCP SDUs received by the second PDCP layer.

2. The method of claim 1, wherein the first network is associated with a long term evolution (LTE) network and the second network is associated with a new radio (NR) network.

3. The method of claim 2, further comprising:
 indicating, by the first PDCP layer associated with the first network, to the second PDCP layer associated with the second network to perform a PDCP re-establishment procedure;
 performing a robust header compression (ROHC) reset;
 deriving security keys, wherein the security keys comprise an integrity key and a ciphering key;
 translating LTE PDCP state variables into new radio (NR) PDCP state variables; and
 determining re-establishment of the PDCP layer of the UE as re-establishment of a NR PDCP layer.

4. The method of claim 3, wherein the ROHC reset is performed in case that a drb-continue ROHC parameter is not configured.

5. The method of claim 3, wherein the integrity key is derived based on a configured NR integrity procedure and the ciphering key is derived based on an NR encryption procedure.

6. The method of claim 3, wherein the LTE PDCP state variables are translated into the NR PDCP state variables based on one of a continuing sequence number (SN) parameter or a continuing count parameter.

7. The method of claim 1, wherein transmitting the PDCP SDUs comprises:
 identifying the PDCP SDUs to be re-transmitted;
 processing a PDCP header of the identified PDCP SDUs based on the second format;
 compressing the PDCP header of the identified PDCP SDUs based on a NR PDCP operation;
 performing an integrity check of the PDCP PDUs by calculating a message authentication code-integrity (MAC-I) based on a configured NR integrity procedure;
 encrypting a PDCP payload of the PDCP PDUs based on a configured NR encryption procedure; and
 delivering the encrypted PDCP payload of the PDCP PDUs to an LTE RLC layer for transmission.

8. The method of claim 1, further comprising:
 performing an integrity check of the received PDCP PDUs based on a configured NR integrity procedure;
 separating a PDCP header and a PDCP payload of the received PDCP PDUs;
 decrypting the PDCP payload based on a configured NR encryption procedure;
 decompressing the PDCP header based on an NR operation;
 processing the PDCP header based on the second format;
 performing a duplicate detection operation by identifying duplicate PDCP SDUs and discarding the identified duplicate PDCP SDUs;
 reordering a function on the PDCP SDUs; and
 delivering the decrypted PDCP payload to upper layers.

9. An E-UTRA-NR dual connectivity (EN-DC) capable user equipment (UE) for handling a packet data convergence protocol (PDCP) operation in a wireless communication system, the UE comprising:
 a memory;
 a transceiver; and
 at least one processor coupled with the transceiver and configured to:
  receive a handover message from a first network, wherein the handover message comprises an indicator indicating a packet data convergence protocol (PDCP) version change for a first PDCP layer of the first network;

transmit the indicator to a the PDCP layer of the UE, wherein the UE is in a connected state with the first network comprising the first PDCP layer and an RLC layer that are established with the UE;

perform re-establishment of the RLC layer based on the indicator;

receive first PDCP protocol data units (PDUs) from the RLC layer in response to performing the re-establishment of the RLC layer;

process, based on a first format, the first PDCP PDUs at the first PDCP layer;

perform re-establishment of the first PDCP layer as associated with the first network;

transmit, based on a second format, PDCP service data units (SDUs) to a second network in accordance with a second PDCP layer that is determined by the re-establishment of the first PDCP layer associated with the first network; and process, the PDCP SDUs received by the second PDCP layer.

10. The method of claim 2, further comprising:

performing an integrity check of the received PDCP PDUs based on a configured LTE integrity procedure;

separating a PDCP header and a PDCP payload of the PDCP PDUs;

decrypting the PDCP payload based on a configured LTE encryption procedure;

decompressing the PDCP header based on an LTE operation;

processing the PDCP header based on an LTE format; and delivering the decrypted PDCP payload to upper layers.

* * * * *